United States Patent
Agrawal et al.

(10) Patent No.: US 9,569,540 B2
(45) Date of Patent: *Feb. 14, 2017

(54) RELATED URLS FOR TASK-ORIENTED QUERY RESULTS

(71) Applicant: MICROSOFT TECHNOLOGY LICENSING, LLC, Redmond, WA (US)

(72) Inventors: Nitin Agrawal, Redmond, WA (US); Tabreez Govani, Mukilteo, WA (US); Jamie P. Buckley, Redmond, WA (US); Michael Maxwell Cameron, San Francisco, CA (US); Liwei Chen, Seattle, WA (US); Hugh Evan Williams, Saratoga, CA (US); Sanaz Ahari, Bellevue, WA (US); Yang Yang Zhang, Bellevue, WA (US); Srinath Reddy Aaleti, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/046,625

(22) Filed: Feb. 18, 2016

(65) Prior Publication Data

US 2016/0162580 A1    Jun. 9, 2016

Related U.S. Application Data

(63) Continuation of application No. 13/973,111, filed on Aug. 22, 2013, now Pat. No. 9,275,158, which is a
(Continued)

(51) Int. Cl.
*G06F 17/30*    (2006.01)

(52) U.S. Cl.
CPC ... *G06F 17/30864* (2013.01); *G06F 17/30876* (2013.01); *G06F 17/30887* (2013.01)

(58) Field of Classification Search
CPC ............... G06F 17/30864; G06F 17/30876; G06F 17/30887
See application file for complete search history.

(56) References Cited

U.S. PATENT DOCUMENTS

| 5,321,228 A | 6/1994 | Krause |
| 6,256,623 B1 | 7/2001 | Jones |

(Continued)

OTHER PUBLICATIONS

Yumao, Lu, et al., "Coupling Feature Selection and Machine Learning methods for Navigational Query Identification," CIKM'06, Nov. 5-11, 2006, Arlington, Virginia, USA, 8 pages, http://www.ee.ucla.edu/~luym/LuPengLiAhmed06CIKM.pdf.
(Continued)

*Primary Examiner* — Huawen A Peng
(74) *Attorney, Agent, or Firm* — Jessica Meyers; Tom Wong; Micky Minhas

(57) ABSTRACT

Methods, computer-storage media, and graphical user interfaces are provided for identifying and presenting rich related sites for task-oriented search queries. Upon receipt of a search query input by a user, one or more query logs are analyzed to determine if the search query is a related to a task being performed by the user. If the query is determined to be a task-oriented search query, search results are identified, as is one or more Uniform Resource Locators (URLs) related to a particular search result. The related URL is presented to the user in association with the particular search result. Additional controls, e.g., search tools that facilitate querying of those URLs determined to be relevant to a particular search result, may also be provided to aid the user in performing the task at hand.

20 Claims, 20 Drawing Sheets

Related U.S. Application Data continuation of application No. 12/696,938, filed on Jan. 29, 2010, now Pat. No. 8,543,592, which is a continuation of application No. 12/485,476, filed on Jun. 16, 2009, now abandoned, which is a continuation-in-part of application No. 12/130,212, filed on May 30, 2008, now abandoned.

(56) References Cited

U.S. PATENT DOCUMENTS

| | | | |
|---|---|---|---|
| 6,321,228 B1 | 11/2001 | Crandall | |
| 6,549,941 B1 | 4/2003 | Jaquith | |
| 6,591,261 B1 | 7/2003 | Arthurs | |
| 6,732,086 B2 | 5/2004 | Plow | |
| 7,159,023 B2 | 1/2007 | Tufts | |
| 7,925,649 B2* | 4/2011 | Jeh | G06F 17/30864 707/722 |
| 8,271,546 B2* | 9/2012 | Gibbs | G06F 17/30887 707/805 |
| 9,223,868 B2* | 12/2015 | Battle | G06F 17/30864 |
| 2005/0004943 A1 | 1/2005 | Chang | |
| 2005/0076019 A1 | 4/2005 | Jackson | |
| 2005/0222976 A1* | 10/2005 | Pfleger | G06F 17/30646 |
| 2006/0064411 A1* | 3/2006 | Gross | G06F 17/30864 |
| 2007/0038607 A1 | 2/2007 | Herman | |
| 2007/0061313 A1* | 3/2007 | Kahle | G06F 17/30864 |
| 2007/0100799 A1 | 5/2007 | Rose | |
| 2007/0136256 A1* | 6/2007 | Kapur | G06F 17/3069 |
| 2007/0208730 A1 | 9/2007 | Agichtein | |
| 2008/0059451 A1 | 3/2008 | Musgrove | |
| 2008/0059508 A1* | 3/2008 | Lu | G06F 17/30707 |
| 2008/0120276 A1* | 5/2008 | Chennavasin | G06F 17/30864 |
| 2008/0235187 A1* | 9/2008 | Gade | G06F 17/3064 |
| 2009/0019037 A1 | 1/2009 | Kumar | |
| 2009/0037421 A1* | 2/2009 | Gamble | G06F 17/30864 |
| 2009/0077037 A1 | 3/2009 | Wu | |
| 2009/0248666 A1* | 10/2009 | Ahluwalia | G06F 17/30864 |

OTHER PUBLICATIONS

Eugene Agichtein, et al., "Learning User Interaction Models for Predicting Web Search Result Preferences," SIGOR'06, Aug. 6-11, 2006, Seattle Washington, USA, 8 pages, http://www.mathcs.emory.edu/~eugene/papers/sigir2006preferences.pdf.

Eugene Agichtein, et al., "Identifying "Best Bet" Web Search Results by Mining Past User Behavior," KDD'06, Aug. 20-23, 2006, Philadelphia, Pennsylvania, USA, 7 pages, http://www.cscoulumbia,edu/~eugene/papers/kdd2006.pdf.

"Final Office Action Issued in U.S. Appl. No. 12/130,212", Mailed Date: May 6, 2011, 18 Pages.

"Final Office Action Issued in U.S. Appl. No. 12/130,212", Mailed Date: Jan. 18, 2012, 20 Pages.

"Final Office Action Issued in U.S. Appl. No. 12/130,212", Mailed Date: Nov. 26, 2012, 27 Pages.

"Non-Final Office Action Issued in U.S. Appl. No. 12/130,212", Mailed Date: Oct. 4, 2011, 18 Pages.

"Non-Final Office Action Issued in U.S. Appl. No. 12/130,212", Mailed Date: Dec. 2, 2010, 20 Pages.

"Non-Final Office Action Issued in U.S. Appl. No. 12/130,212", Mailed Date: Jul. 18, 2012, 25 Pages.

"Final Office Action Issued in U.S. Appl. No. 12/696,938", Mailed Date: Apr. 3, 2012, 21 Pages.

"Non-Final Office Action Issued in U.S. Appl. No. 12/696,938", Mailed Date: Dec. 28, 2012, 21 Pages.

"Non-Final Office Action Issued in U.S. Appl. No. 12/696,938", Mailed Date: Nov. 14, 2011, 21 Pages.

"Notice of Allowance Issued in U.S. Appl. No. 12/696,938", Mailed Date: May 23, 2013, 11 Pages.

"Final Office Action Issued in U.S. Appl. No. 13/973,111", Mailed Date: Oct. 16, 2014, 11 Pages.

"Non-Final Office Action Issued in U.S. Appl. No. 13/973,111", Mailed Date: Jun. 25, 2015, 10 Pages.

"Non-Final Office Action Issued in U.S. Appl. No. 13/973,111", Mailed Date: May 30, 2014, 17 Pages.

"Notice of Allowance Issued in U.S. Appl. No. 13/973,111", Mailed Date: Oct. 26, 2015, 8 Pages.

* cited by examiner

| IP ADDRESS | TIME | DATE | SEARCH QUERY | CLICKED ON URL |
|---|---|---|---|---|
| 65.148.46.2 | 12:12 | 4/22/2008 | SEATTLE WEATHER | WWW.WEATHERSEA.COM |
| 65.148.46.2 | 12:12 | 4/22/2008 | SEATTLE WEATHER | WWW.SEATTLEWEATHER.COM |
| 61.147.39.25 | 12:30 | 4/22/2008 | MICROSOFTq | WWW.MICROSOFT.COM |
| 99.119.27.28 | 12:48 | 4/22/2008 | MICROSOFTq | WWW.MICROSOFT.COM |
| 26.183.36.12 | 12:49 | 4/22/2008 | MICROSOFTq | WWW.MICROSOFT.COM |
| 69.126.64.36 | 12:50 | 4/22/2008 | SEATTLE WEATHER | WWW.WEATHERSEATTLE.COM |

*FIG. 3.*

RELATED URLS FOR TASK-ORIENTED QUERY RESULTS

CROSS-REFERENCE TO RELATED APPLICATIONS

This application is a continuation of U.S. application Ser. No. 13/973,111, filed Aug. 22, 2013, titled "Related Urls For Task-Oriented Query Results," which is a continuation of U.S. application Ser. No. 12/696,938, filed Jan. 29, 2010, titled "Related Urls For Task-Oriented Query Results," now U.S. Pat. No. 8,543,592, issued Sep. 24, 2013, which is a continuation of U.S. application Ser. No. 12/485,476, filed Jun. 16, 2009, titled "Related Urls For Task-Oriented Query Results, now abandoned, which is a continuation-in-part of U.S. application Ser. No. 12/130,212, filed May 30, 2008, titled "Presenting Search Queries Related to Navigational Search Queries," now abandoned, all of which are incorporated herein by reference in their entireties.

BACKGROUND

Search queries are often issued by a user to a search engine. The search query may contain search terms that define information or other web sites that the user is seeking. Search queries may generally be classified as falling into one of two broad categories: discovery queries and task-oriented queries.

Discovery queries are issued by a user seeking information about a topic. Search results are then generated by the search engine according to one or more algorithms. Discovery queries are further characterized by the user seeking information from any source, and not any particular web site. For instance, a search query containing the element "Seattle" would be recognized as a discovery query. Multiple links to URLs may be generated by the search engine as a set of search results. Often a user may browse the search results and select results presented throughout the set of search results. Users may also select one link in the search result set and view the corresponding web site, only to discover that site did not provide the information they were seeking. The users may then return to the set of search results and select a link presented farther down in the list of search results.

Task-oriented queries are those issued by a user seeking to accomplish a particular task. Such queries may be navigational, categorical, or otherwise related to a particular task. Navigational queries are those issued by a user seeking to navigate to a specific web site. For instance, a search query of "Microsoft" represents a navigational query, as the user is likely seeking to navigate to the web site of the Microsoft Corporation, based in Redmond, Wash. Under most algorithms employed by search engines, a link to the URL of http://www.microsoft.com would be displayed as the first search result. Categorical queries are those issued by a user seeking information about a particular category of information. For instance, a search query of any of "world news" or "buy books online" or "rental cars" represents a categorical query, as the user is likely seeking to peruse multiple sources of information about the queried item. Under most algorithms employed by search engines, links to a plurality of URLs, each representative of the information category, would be displayed as search results.

SUMMARY

Embodiments of the present invention relate to methods, computer-storage media, and graphical user interfaces for identifying and presenting rich related sites for task-oriented search queries. Upon receipt of a search query input by a user, one or more query logs are analyzed to determine if the search query is related to a task being performed by the user. Such tasks may include, by way of example only, comparison shopping, social networking, researching a topic, reading news, reviewing blogs, searching for reviews, or booking a trip. If the query is determined to be a task-oriented search query, search results are identified, as is one or more Uniform Resource Locators (URLs) related to a particular search result. The related URL is presented to the user in association with the particular search result. Additional controls, e.g., tools that facilitate searching the content on the web site pointed to by those URLs determined to be relevant to a particular search result, may also be provided to aid the user in performing the task at hand. These controls are conveniently presented to the user in a user interface, and provide powerful assistance to improving the quality and speed of searching for task-related information.

This Summary is provided to introduce a selection of concepts in a simplified form that are further described below in the Detailed Description. This Summary is not intended to identify key features or essential features of the claimed subject matter nor is it intended to be used to limit the scope of the claimed subject matter.

BRIEF DESCRIPTION OF THE DRAWINGS

The present invention is described in detail below with reference to the attached drawing figures, wherein:

FIG. 3 is a block diagram illustrating a sample query log, in accordance with an embodiment of the invention;

DETAILED DESCRIPTION

Figure 1:
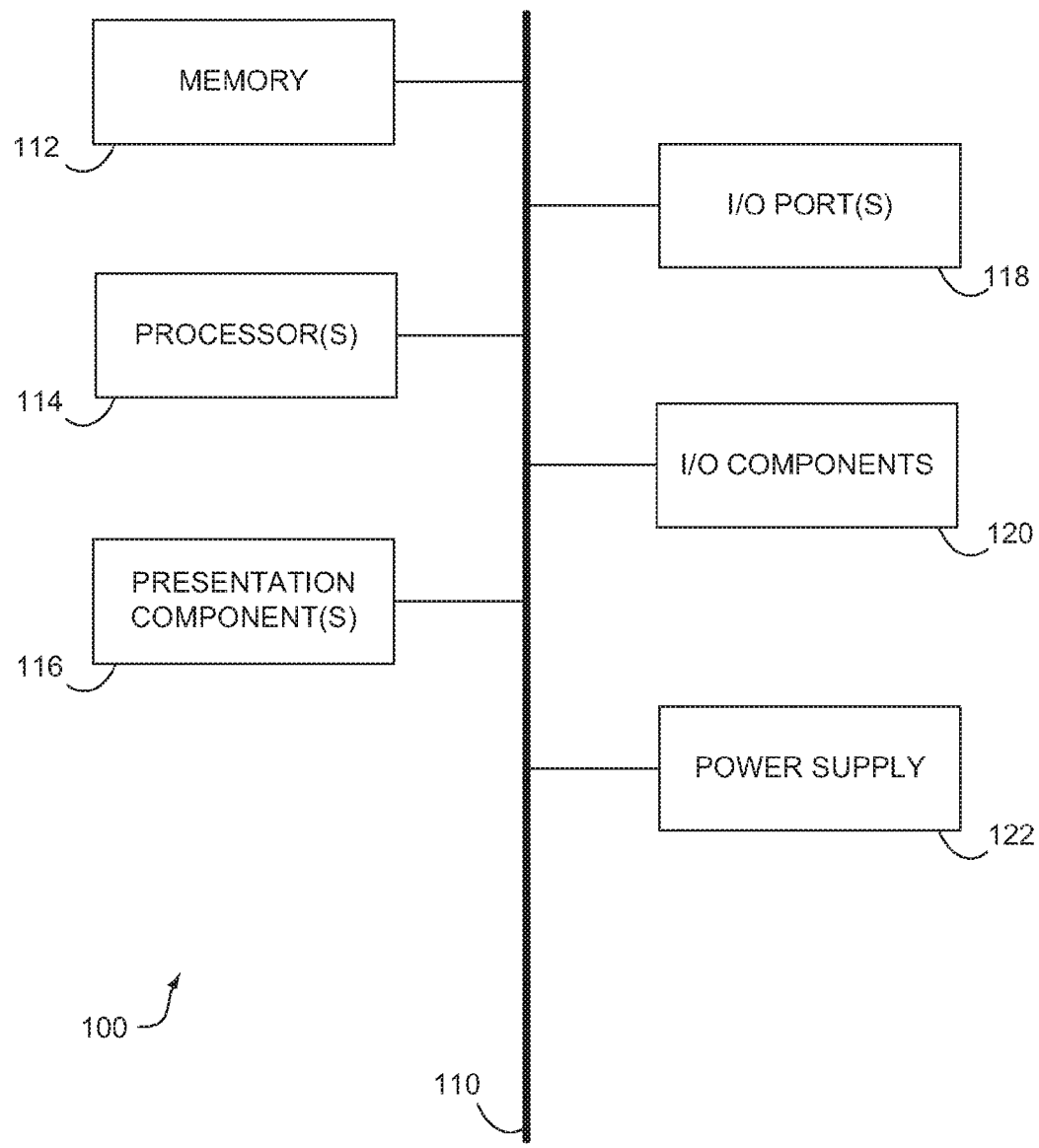
FIG. 1 is a block diagram of a computing system environment suitable for use in implementing embodiments of the present invention.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate generally to methods, computer-storage media, and graphical user interfaces for identifying and presenting rich related sites for task-oriented search queries. Upon receipt of a search query input by a user, one or more query logs are analyzed to determine if the search query is a related to a task being performed by the user. Such tasks may include, by way of example only, comparison shopping, social networking, researching a topic, reading news, reviewing blogs, searching for reviews, or booking a trip. If the query is determined to be a task-oriented search query, search results are identified, as is one or more Uniform Resource Locators (URLs) related to a particular search result. The related URL is presented to the user in association with the particular search result. Additional controls, e.g., tools that facilitate searching the content on the web site pointed to by those URLs determined to be relevant to a particular search result, may also be provided to aid the user in performing the task at hand. These controls are conveniently presented to the user in a user interface, and provide powerful assistance to improving the quality and speed of searching for task-related information.

Accordingly, in one embodiment, the present invention is directed to one or more computer storage media having computer-executable instructions embodied thereon that, when executed, perform a method for providing uniform resource locators (URLs) related to search results determined for task-oriented search queries input by users. The method includes receiving a search query input by a user; determining that the input search query is a task-oriented search query utilizing at least one query log; identifying at least one search result that satisfies the task-oriented search query; identifying, with respect to the at least one search result, at least one related URL; and presenting an identifier for the at least one related URL in association with an identifier for the at least one search result. The method may further include navigating to the related URL upon user selection of the identifier for the related URL. Still further, the method may include presenting one or more controls in association with the identifier for the at least one related URL and the identifier for the at least one search result. Each control provides additional information and/or additional functionality with respect to the associated at least one related URL. For instance, one exemplary control permits user input of an additional query; receiving, via the control, user input of the additional query; and querying only content associated with the web site associated with the at least one related URL to determine if the content associated with the web site associated with the at least one related URL matches the additional query.

In another embodiment, the present invention is directed to a computerized method for providing uniform resource locators (URLs) related to search results determined for task-oriented search queries input by users. The method includes receiving a search query input by a first user via a first computing device during a first search session and presenting a first plurality of search results satisfying the input search query in association with a display device associated with the first computing device. The method further includes receiving a selection of one of the first plurality of search results from the first user via the first computing device; receiving a request from the first user via the first computing device to navigate to a URL that differs from a URL corresponding to the selected one of the first plurality of search results, wherein the request is received during the first search session. Still further, the method includes determining, utilizing a second computing device, that the input search query is a task-oriented search query and that the URL to which the first user requested to navigate is related to the one of the first plurality of search results. The method additionally includes receiving the search query from a second user via a third computing device during a second search session and presenting a second plurality of search results satisfying the search query in association with a display device associated with the third computing device, the second plurality of search results including the selected one of the first plurality of search results. Further, the method includes presenting, in association with the display device associated with the third computing device, an identifier for the related URL in association with the selected one of the first plurality of search results.

In yet another embodiment, the present invention is directed to a graphical user interface embodied on one or more computer storage media, and executable on a computing device. The graphical user interface includes a first display area displaying a plurality of search results and a second display area graphically associated with at least one of the plurality of search results, the second display area displaying a plurality of URL identifiers each associated with a URL determined to be related to the at least one of the plurality of search results.

Having briefly described an overview of embodiments of the present invention, an exemplary operating environment suitable for use in implementing embodiments of the present invention is described below.

Referring to the drawings in general, and initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of the invention. Neither should the illustrated computing environment be interpreted as having any dependency or requirement relating to any one or combination of components/modules illustrated.

Embodiments of the invention may be described in the general context of computer code or machine-useable instructions, including computer-executable instructions such as program components, being executed by a computer or other machine, such as a personal data assistant or other hand-held device. Generally, program components including routines, programs, objects, components, data structures, and the like, refer to code that performs particular tasks, or implements particular abstract data types. Embodiments of the present invention may be practiced in a variety of system configurations, including hand-held devices, consumer electronics, general-purpose computers, specialty-computing devices, and the like. Embodiments of the present invention may also be practiced in distributed computing environments where tasks are performed by remote-processing devices that are linked through a communications network.

With continued reference to FIG. 1, the computing device 100 includes a bus 110 that directly or indirectly couples the following devices: a memory 112, one or more processors 114, one or more presentation components 116, input/output (I/O) ports 118, I/O components 120, and an illustrative power supply 122. The bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computer" or "computing device."

The computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other medium that can be used to encode desired information and be accessed by the computing device 100.

The memory 112 includes computer-storage media in the form of volatile and/or nonvolatile memory. The memory may be removable, non-removable, or a combination thereof. Exemplary hardware devices include solid-state memory, hard drives, optical-disk drives, and the like. The computing device 100 includes one or more processors that read data from various entities such as the memory 112 or I/O components 120. The presentation component(s) 116 present data indications to a user or other device. Exemplary presentation components include a display device, speaker, printing component, vibrating component, etc. The I/O ports 118 allow the computing device 100 to be logically coupled to other devices including the I/O components 120, some of which may be built in. Illustrative components include a microphone, joystick, game advertisement, satellite dish, scanner, printer, wireless device, and the like.

Figure 2:
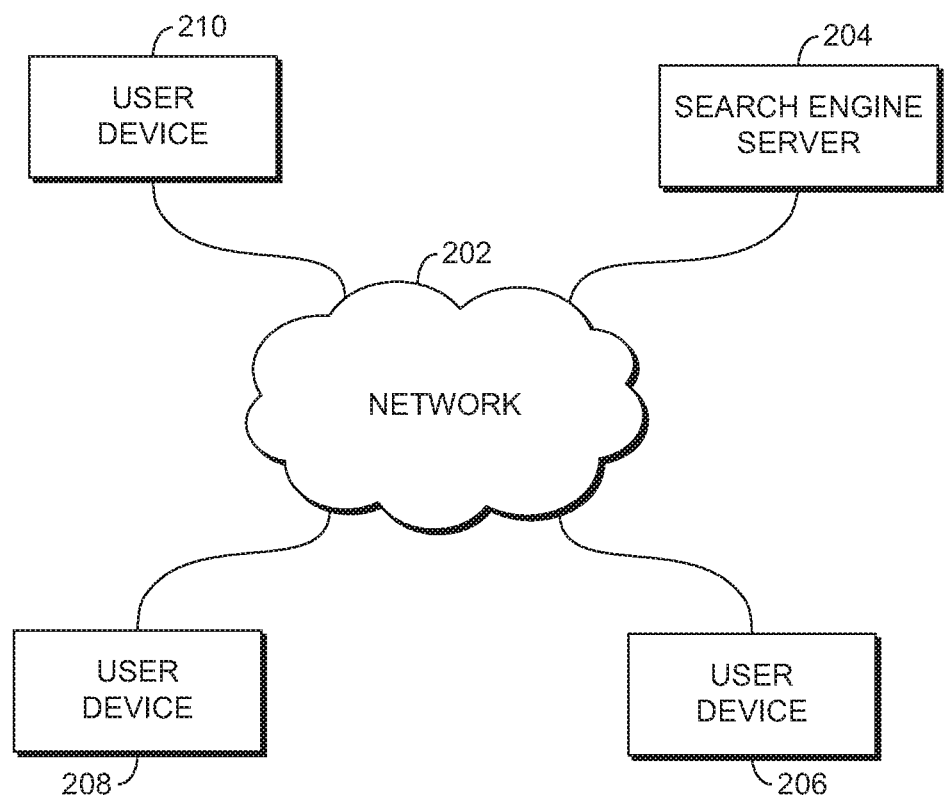
FIG. 2 is a block diagram illustrating an overview of a system, in accordance with an embodiment of the invention.

Turning now to FIG. 2, a block diagram is illustrated that shows an exemplary computing network system 200 configured to receive search queries presented by a user, in accordance with an embodiment of the present invention. It will be understood and appreciated by those of ordinary skill in the art that the computing network system 200 shown in FIG. 2 is merely an example of one suitable computing network environment and is not intended to suggest any limitation as to the scope of use or functionality of the present invention. Neither should the computing network system 200 be interpreted as having any dependency or requirement related to any single component/module or combination of components/modules illustrated therein.

The computing network system 200 includes user devices 206, 208, and 210, and search engine server 204 all in communication with one another via a network 202. The network 202 may include, without limitation, one or more local area networks (LANs) and/or wide area networks (WANs). Such networking environments are commonplace in offices, enterprise-wide computer networks, intranets, and the Internet. Accordingly, the network 202 is not further described herein.

The user devices 206, 208, and 210 may be any type of computing device used by an end user. By way of example, and not limitation, user devices may be personal computers, PDAs, cell phones, smart phones, or any other computing device used by an end user. Common to the exemplars presented is the ability to receive a search query and communicate that query to the search engine server 204 through the network 202.

While an end user may be an ordinary human user, other types of end users are contemplated as well. For instance, an end user may also be another computing application. Accordingly, an end user should not be construed as being limited to a human user.

The search engine server 204 receives search queries entered on user devices 206, 208, and 210 through the network 202. The search queries may be entered into a depiction of a web site generated on the user devices 206, 208, and 210. Search queries may generally be grouped into one of two classifications: discovery search queries and task-oriented search queries. Task-oriented search queries may further be generally grouped as navigational search queries, categorical search queries, or queries otherwise related to a particular task the user is seeking to accomplish.

Discovery search queries are oftentimes issued by a user seeking information about a topic. Search results are then generated by the search engine server 204 according to one or more search algorithms. Discovery search queries are further characterized by the user seeking information from any source, and not any particular web site. For instance, a search query containing the element "Seattle" would be recognized as a discovery query. Multiple links to URLs may be generated by the search engine server 204 as a list of search results. Often a user may browse the search results and select results presented throughout the list of search results. Users may also select one link in the search result and view the corresponding web site, only to discover that web site did not provide the information they were seeking. The users may then return to the list of search results and select a link presented farther down in the list of search results.

Task-oriented queries are those issued by a user seeking to accomplish a particular task. Search results are then generated by the search engine server 204 according to one or more search algorithms. Task-oriented search queries may be navigational, categorical, or otherwise related to a particular task. Navigational search queries are those issued by a user seeking to navigate to a specific web site. For instance, a user may enter the name of an entity or organization as a search query when they seek to be presented with a link to the entity or organizations web site. As such, a search query of "Microsoft" would be recognized as a navigational search query, as the user is likely seeking to navigate to the web site of the Microsoft Corporation, based in Redmond, Wash. Under most algorithms employed by search engines, such as search engine server 204, a link to the URL of http://www.microsoft.com would be displayed as the first search result. While multiple search results may be generated by a search engine in response to a navigational search query, often the user will select the first search result presented and will not select a link presented farther down the list. Additionally, it is unlikely that a user will return to the list of search results to select a link presented farther down in the list of search results.

Categorical search queries are those issued by a user seeking information about a particular category of information. For instance, a search query of any of "world news" or "buy books online" or "rental cars" would be recognized as a categorical query, as the user is likely seeking to peruse multiple sources of information about the queried item. Under most algorithms employed by search engines, links to a plurality of URLs, each representative of the information category, would be displayed as search results. Often the user will select the first search result presented, view any desired information from the associated URL, then return to the list of search results and select another link presented farther down the list of search results to view similar information. The user may return to the search results list and select a different presented search result a number of times in an effort to draw comparisons to the information provided in association with the selected URLs. For instance, a search query of "rental cars" may return URLs directed to the web sites of the top five rental car companies as search results. A user may select the first search result and input his or her desired dates and location to obtain a rental car price. The user may then return to the search results page, select the second listed rental car company's URL (that is, the second listed search result) and perform the same date/price inquiry. The user may then return to the search results page the desired number of times to obtain similar information from any number of the listed search results and then compare the information obtained.

Returning to the discussion of the search engine server 204 of FIG. 2, after receiving the search query, the search engine server 204 then generates links to one or more URLs based on search algorithms and subsequently communicates those links as search results to the user devices 206, 208, and 210 through the network 202. An end user may then select one or more of the search results to be directed to the web site corresponding to the URL selected in the search results. The user can make the selection through the use of a pointing device, such as a "mouse", or through the use of any other input method. The search engine server 204 may track and record a unique identifier associated with each end user entering search queries, the search queries entered, URLs selected in the search results, and the time and date that the search query is issued and URLs selected. This information can be referred to as user session data and these records are collectively referred to as a query log, and are discussed further in relation to at least FIG. 3. In alternative embodiments of the invention a separate server, not depicted in FIG. 2, may collect and generate a query log by receiving communications through the network 202 from the search engine server 204.

Turning now to FIG. 3, an exemplary query log 300 is depicted. The columns of the query log 300 define the individual fields of data recorded for each search query. The first field is the IP address of the user device from which the search query was issued. Fields for the time and date that the search queries were received by the search engine server 204 are depicted. In other embodiments of the invention, additional time and date fields may represent the respective time and date that a search query was entered into the user device 206, 208, and 210. Although not depicted in FIG. 3, an additional time field may be provided in the query log 300 for recording the time and date on which the URL was selected. Additional fields in the query log 300 provide for the recordation of the search query received from the user, as well as the URL selected in the search results. Each row of the query log provides a unique reference for an issuance of a search query by a user. This depiction of a query log 300 is provided for illustrative purposes only, and ones skilled in the art will understand that a query log may take nearly limitless forms. Further, query logs may contain more or less information than that presented in accordance with FIG. 3. One skilled in the art would recognize that information regarding a user's browsing history may also be included in a query log. Accordingly, the format and content presented in FIG. 3 should be interpreted as merely an example of one of many acceptable query log formats and content contained therein.

Figure 4:
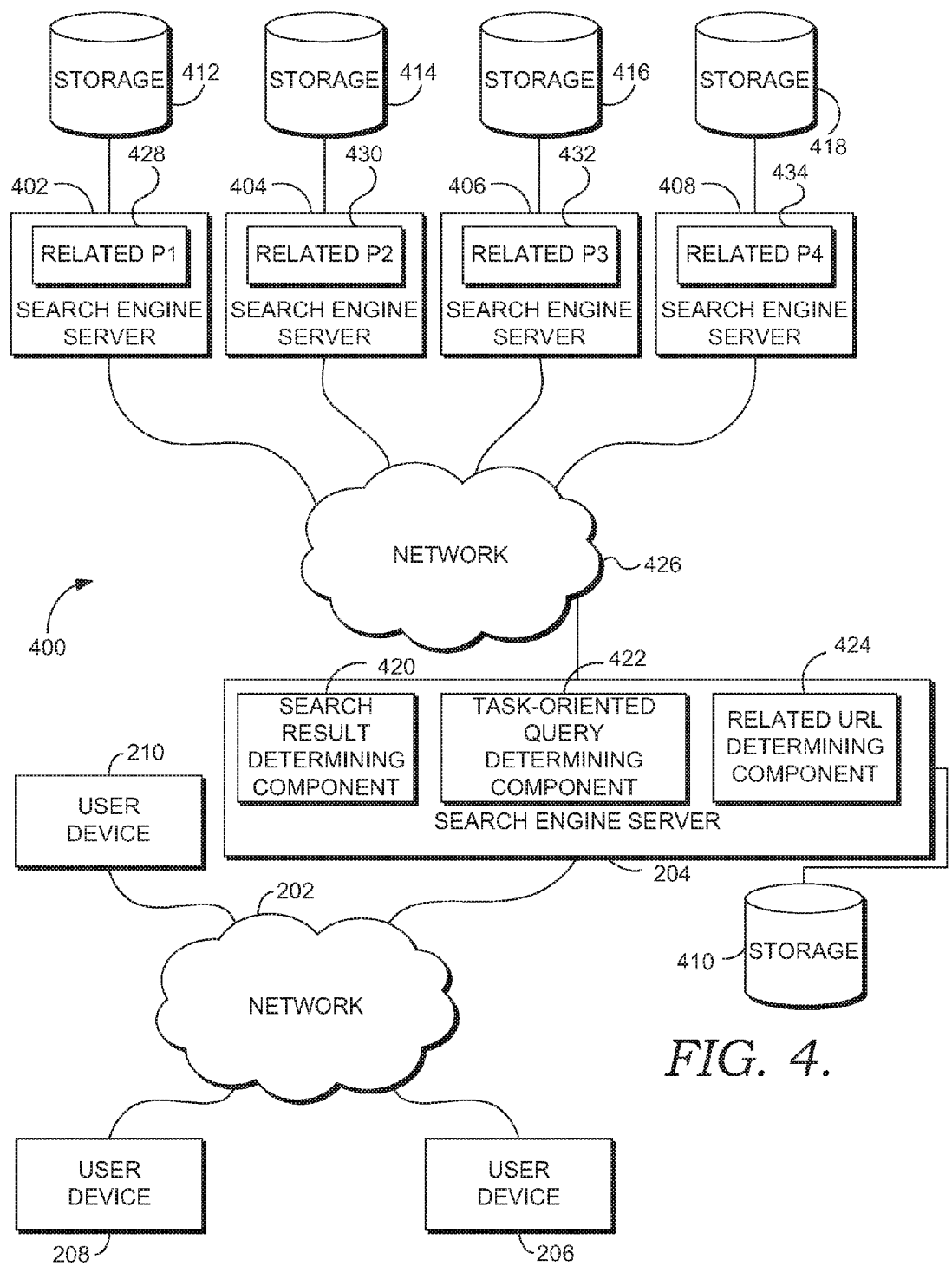
FIG. 4 is an block diagram illustrating an overview of a system, in accordance with an embodiment of the invention.

Turning now to FIG. 4, a block diagram is depicted that illustrates an overview of system 400 in accordance with embodiments of the invention. The system 400 includes user devices 206, 208, 210 and a search engine server 204, all in communication with one another over a network 202 (which network was described hereinabove with respect to FIG. 2). The system further includes a plurality of additional search engine servers 402, 404, 406 and 408 configured such that the system 400 may operate as a distributed service. Each of search engine servers 204, 402, 404, 406 and 408 has access to at least one database, illustrated as 410, 412, 414, 416 and 418, respectively. The user devices 206, 208, 210 are configured to transmit search queries to the search engine server 204. In response thereto, the search engine server 204 is configured to return a Search Engine Results Page (SERP) having one or more search results that satisfy the received query. One exemplary SERP is depicted in browser tab 1999 of FIG. 19, more fully described herein below. In the embodiment depicted in FIG. 19, the SERP 1999 includes a number of selectable links, e.g., 1951, 1921, 1923 and 1927 that, upon user selection are operative to request a URL from a server somewhere on the world-wide web. Any such link, whether presented in a browser application (e.g., browser applications 520 and 528 of FIG. 5), an agent (e.g., data management agent 530 of FIG. 5), an operating system (e.g., operating system 536 of FIG. 5), a local application (e.g., local application 524 of FIG. 5) or a web-page (e.g., SERP 1306 of FIG. 13 or SERP 1999 of FIG. 19), results in a hyper-request upon selection thereof. As utilized herein, a "hyper-request" is a request for a particular URL.

In embodiments, a query log is formed from all selections received from a SERP, whether or not the URL requested is hosted by a search engine server such as 204. For example, with reference to FIG. 19, selection of link 1921 requests the URL www.target.com, and the search engine server 204 forms an entry in a query log from this selection because it receives a signal indicating that a user device (e.g., user device 206 of FIG. 4) selected the link 1921. In embodiments, query log entries are formed from all requests that issue from a browser application (e.g., browser application 1710 of FIG. 17). For example, the search engine server 204 may perform a white-listing or blacklisting service for a browser, so that every URL requested by the browser is first sent to the search engine server 204 to determine that the requested URL is safe. Query log entries may be formed from all such URLs whether they are typed into a URL text box (e.g., text box 1730 of FIG. 17), prompted through an auto-suggestion menu entry (e.g., auto suggestion entry 1751 of FIG. 17), in a drop down menu (such as drop down menu 1750 of FIG. 17), or selected from a SERP (e.g., SERP 1999 of FIG. 19).

Still with regard to FIG. 4, the search engine server 204 includes a search result determination component 420, a task-oriented query determination component 422 and a related URL determination component 424. The search result determination component 420 is configured to identify search results satisfying a query received from one of the user devices 206, 208, 210 (via the network 202). Any number of algorithms for identifying or determining search results that satisfy search queries that are known in the art may be utilized by the search result determination component 420. Accordingly, such algorithms are not further described herein. In embodiments, search results may be presented as hyper-links that are indexed from the web, with a corresponding description. The hyper-link may be or include the URL corresponding to the web page being referred to or an identifier there for. The search engine server 204 communicates the hyper-links (and/or corresponding identifiers) as search results to the user devices 206, 208, and 210 through the network 202, for instance, in association with a SERP (e.g., SERP 1999 of FIG. 19). An end user may then select one or more of the search results to be directed to the web site corresponding to the URL selected in the search results. The user can make the selection through the use of a pointing device, such as a "mouse", or through the use of any other input method. As previously discussed with respect to FIG. 2, the search engine server 204 may track and record a unique identifier associated with each end user entering search queries, the search queries entered, URLs selected in the search results, and the time and date that the search query is issued and URLs selected in a query log (e.g., the query log shown in FIG. 3).

The task-oriented query determination component 422 is configured to determine whether a search query received by the search engine server 204 is task-oriented or not. Exemplary methods for determining whether a received query is task-oriented are more fully described below with respect to FIGS. 14A, 14B, 15 and 16. As previously described, task-oriented queries may be navigational, categorical, or otherwise related to a particular task. Navigational search queries are those issued by a user seeking to navigate to a specific web site. For instance, a user may enter the name of an entity or organization as a search query when they seek to be presented with a link to the entity or organizations web site. As such, a search query of "Microsoft" would be recognized as a navigational search query, as the user is likely seeking to navigate to the web site of the Microsoft Corporation, based in Redmond, Wash. Under most algorithms employed by search engines, such as search engine server 204, a link to the URL of http://www.microsoft.com would be displayed as the first search result. While multiple search results may be generated by a search engine in response to a navigational search query, often the user will select the first search result presented and will not select a link presented farther down the list. Additionally, it is unlikely that a user will return to the list of search results to select a link presented farther down in the list of search results. Exemplary methods for determining whether a query is a navigational search query is further described below with respect to FIGS. 6 and 7.

Categorical search queries are those issued by a user seeking information about a particular category of information. For instance, a search query of any of "world news" or "buy books online" or "rental cars" would be recognized as a categorical query, as the user is likely seeking to peruse multiple sources of information about the queried item. Under most algorithms employed by search engines, links to a plurality of URLs, each representative of the information category, would be displayed as search results. Often the user will select the first search result presented, view any desired information from the associated URL, then return to the list of search results and select another link presented farther down the list of search results to view similar information. The user may return to the search results list and select a different presented search result a number of times in an effort to draw comparisons to the information provided in association with the selected URLs. For instance, a search query of "rental cars" may return URLs directed to the web sites of the top five rental car companies as search results. A user may select the first search result and input his or her desired dates and location to obtain a rental car price. The user may then return to the search results page, select the second listed rental car company's URL (that is, the second listed search result) and perform the same date/price inquiry. The user may then return to the search results page the desired number of times to obtain similar information from any number of the listed search results and then compare the information obtained. An exemplary method for determining whether a query is a categorical search query is further described below with respect to FIG. 8.

The URL determination component 424 is configured to determine URLs that are related to one or more identified search results. (It should be noted that the use of the term "URL" herein as it pertains to satisfying or matching a search query, being related to another URL or search result, or the like is meant to be interpreted as the content associated with the web site or web page corresponding to the URL satisfies or matches the search query, is related to the content associated with another URL or search result, or the like.) In embodiments, the related URL determination component 424 runs as a distributed service within a data center on a plurality of search engine servers 204, 402, 404, 406, and 408, all in communication with one another via network 426. As with the network 202, the network 426 may include, without limitation, one or more local area networks (LANs) and/or wide area networks (WANs). Such networking environments are commonplace in offices, enterprise-wide computer networks, intranets, and the Internet. Accordingly, the network 426 is not further described herein.

The related URL determination component 424 receives the search results determined by the search result determination component 420 and identifies any URLs that are related to one or more of the determined search results. In the system 400 depicted in FIG. 4, distributed application components Related P1 428, Related P2 430, Related P3 432 and Related P4 434 each process a partition of available related site data, and each returns related results for corresponding partitions P1, P2, P3, and P4 in parallel to the related URL determination component 424. For example, partition P1 may represent related URLs that are identified for an individual user in all past sessions; partition P2 may represent related URLs that are identified from a white-listing service; partition P3 may represent related URLs that are identified from an advertising server that holds relationships between paid advertiser URLs and corresponding competitor URLs; and partition P4 may represents related URLs that are identified from a clustering algorithm run on the search results determined by search result determination component 420. In another example, P1 may represent related data mined from all users' navigational query requests, P2 may represent related data mined from all users' categorical query requests; P3 may represent related data mined from tracking the current session for the current user; and P4 may represent related data mined from tracking all sessions for the current user. In yet another example, P1, P2, P3, and P4 may each represent approximately one quarter of the white-list data for the servers in the same country as the user who submitted the subject query. Any and all such variations, and any combination thereof, are contemplated to be within the scope of embodiments hereof.

In some embodiments the related URL data is stored in association with a database 410 and accessed by search engine server 204. In other embodiments storage of related URL data is distributed between a plurality of databases 410, 412, 414, 416 and 418. Any and all such variations, and any combination thereof, are contemplated to be within the scope of embodiments of the present invention.

Figure 5:
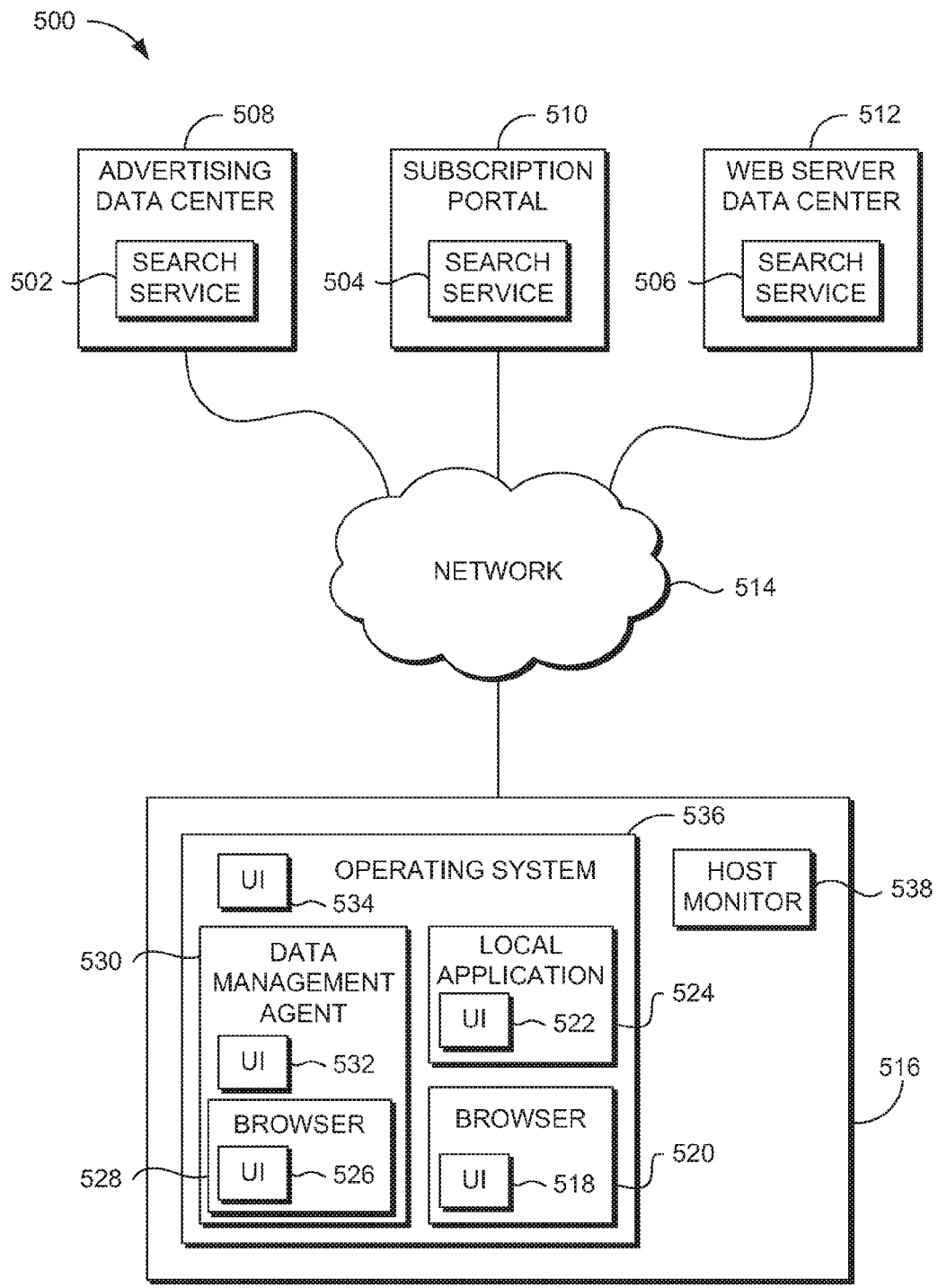
FIG. 5 is a block diagram of representative system elements for performing operations of identifying and presenting rich related URLs related to search query results, in accordance with an embodiment of the invention.

Representative system elements for performing operations of identifying and presenting URLs related to a received search query are depicted in environment 500 of FIG. 5. In embodiments, a search engine (e.g., search engine 204 of FIG. 4) may run as a component of a search service 502, 504, or 506 within an advertising data center 508, a subscription portal 510, or a web server data center 512, respectively. A search service 502, 504, 506 is configured to serve web pages over a network 514 (akin to network 202 of FIG. 2) to a user computing device 516, which presents the served pages, for instance, in a user interface. In embodiments, the user interface 518 run as a component of a browser 520. In embodiments, the user interface 522 runs as a component of a local application 524. In embodiments, the user interface 526 runs as a component of browser 528 hosted by data management application 530. In embodiments, the user interface 532 runs as a component of data management application 530. In embodiments, the user interface 534 runs as a component of operating system 536. Any and all such variations, and any combination thereof, are contemplated to be within the scope of embodiments of the present invention.

In the embodiment illustrated in FIG. 5, the data management agent 530, the local application 524 and the browser 520 run on an operating system 536. An optional host monitor 538 manages operating system instances (such as 536) that operate on the computing device 516. In embodiments, a search service (e.g., search service 502, 504 or 506) may receive (via network 514) input from the user entered into user interface 518 on web pages displayed in browser 520, into user interface 522 of local application 524, into user interface 526 of browser 528 associated with data management agent 530, into user interface 532 of data management agent 530, or into user interface 534 of operating system 536.

Figure 6:
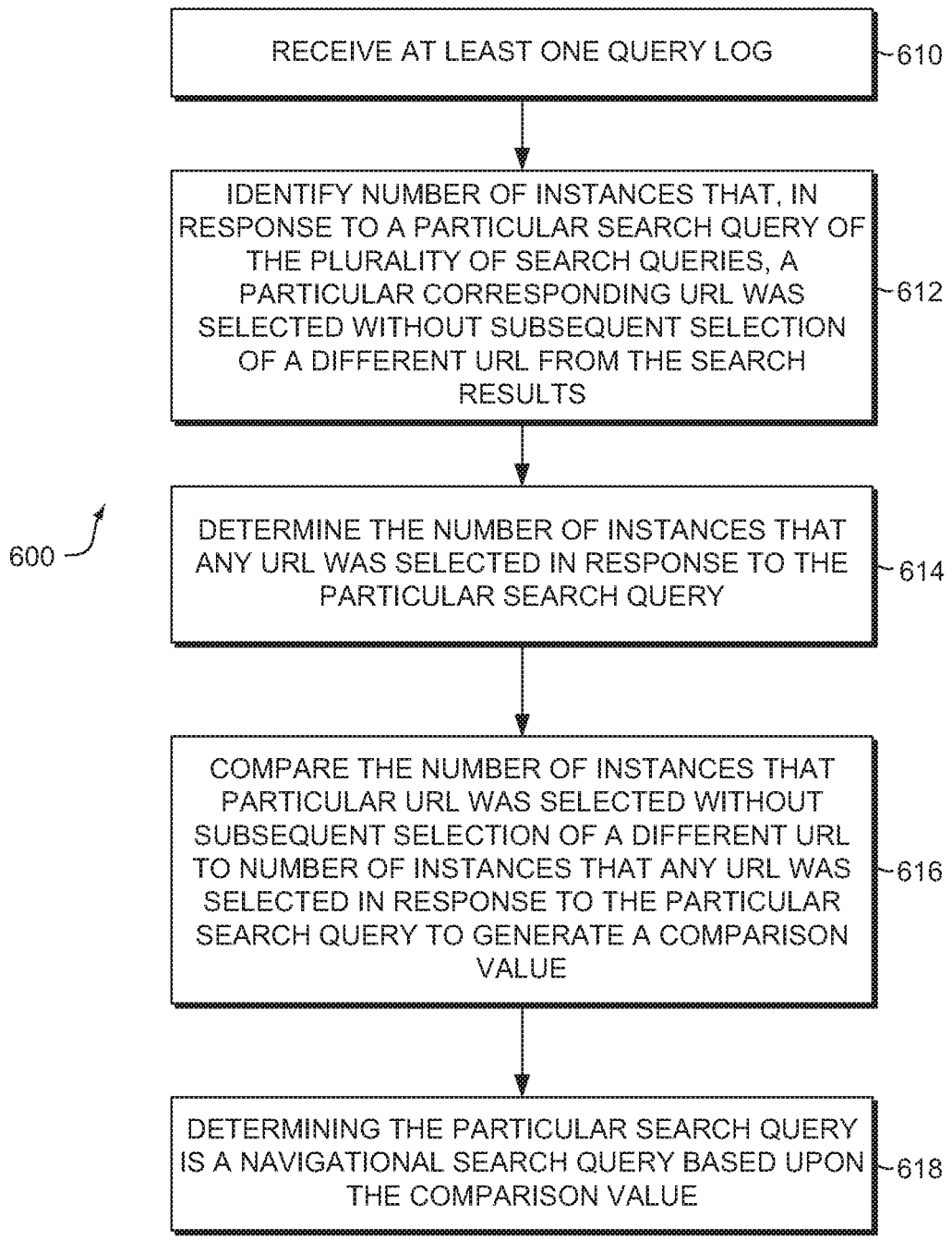
FIG. 6 is a flow diagram illustrating a method for categorizing search queries as navigational search queries, in accordance with an embodiment of the invention.

Turning now to FIG. 6, a flow diagram depicting a method of categorizing one or more search queries as navigational queries is presented. The method begins at block 610 with the receiving of at least one query log. For purposes of discussion, it will be assumed that one query log is received, although it should be recognized that multiple query logs may be received in accordance with embodiments of the invention. While block 610 references the receiving of a query log, the term 'receiving' should be understood to encompass the generation of a query log within the search engine server 204. In this manner, the query log may be 'received' by a different component of the search engine server 204 than the component that generated the query log. As discussed above in regard to FIG. 3, a query log generally contains the following pieces of information for each search query received: the identity of the user device from which the search query was received, the date and time of the reception or issuance of the search query, the elements of the search query, the URL(s) selected in response to the search query, and the date and time the URL(s) were selected in response to the search query. More or less information may be included in the query logs, according to varying embodiments of the present invention. As discussed above, the information contained within the query log may be collectively referred to as user session data.

In block 612, the number of instances that, in response to a particular search query of the plurality of search queries, a particular corresponding URL was selected without a subsequent selection of a different URL from the search results. A particular search query within the meaning of FIG. 6 may be a search query that is received from a user device (e.g., user device 206, 208, or 210 of FIG. 4) by the search engine server 204. The methods described in relation to FIG. 6 may then be instituted to determine if a received search query may be properly determined to be a navigational search query. In accordance with block 612, the query log is analyzed to determine how many times a particular URL was selected in response to the particular search query. Although not depicted in FIG. 6, the portion of the method recited in relation to block 612 may be carried out for each URL that was clicked upon in search results generated for the particular search query. In this manner, each URL that was clicked upon in the search results may be a particular URL for the particular search query.

Simply put, although not explicitly depicted in FIG. 6, the methods recited in blocks 612, 614, 616, and 618 may be repeated for each URL that was selected in response to the particular search query. After completing the iterations for each URL that were selected, each URL will have been a particular URL at one time in the iterative process.

Proceeding on with FIG. 6, in block 614 a determination is made of the number of instances that any URL was selected in response to the particular search query. This determination is made by analyzing the entries of the query log in which the particular search query was issued. The number of distinct URLs selected in response to the particular search query can then be determined.

In block 616, a comparison is made to the number of instances that the particular URL was selected without a subsequent selection of a different URL to the number of instances that any URL was selected in response to the particular search to generate a comparison value. The comparison value can take the form of a ratio. Based upon the comparison value, the particular search query may be determined to be a navigational search query in block 618. The predefined percentage may vary considerably in practice and be regularly adjusted to provide optimal results. In some embodiments of the invention the percentage may be in the 40-50% range. Although it should be understood that in other embodiments of the invention, the percentage may vary significantly based on any number of factors. Those factors may include, but are not limited to: the total number of entries of the query log, the number of URLs selected in response to the particular search query, or the number of instances that the particular URL was selected in response to the particular search query. Accordingly, the range of percentages may vary considerably based on any number of factors.

The navigational search query can then be stored on computer-readable media in association with the particular corresponding URL. When search results are presented in response to the issuance of the navigational search query, at least one of a related query and a URL corresponding to a related query can be presented in association with the navigational search query and the particular corresponding URL.

Figure 7:
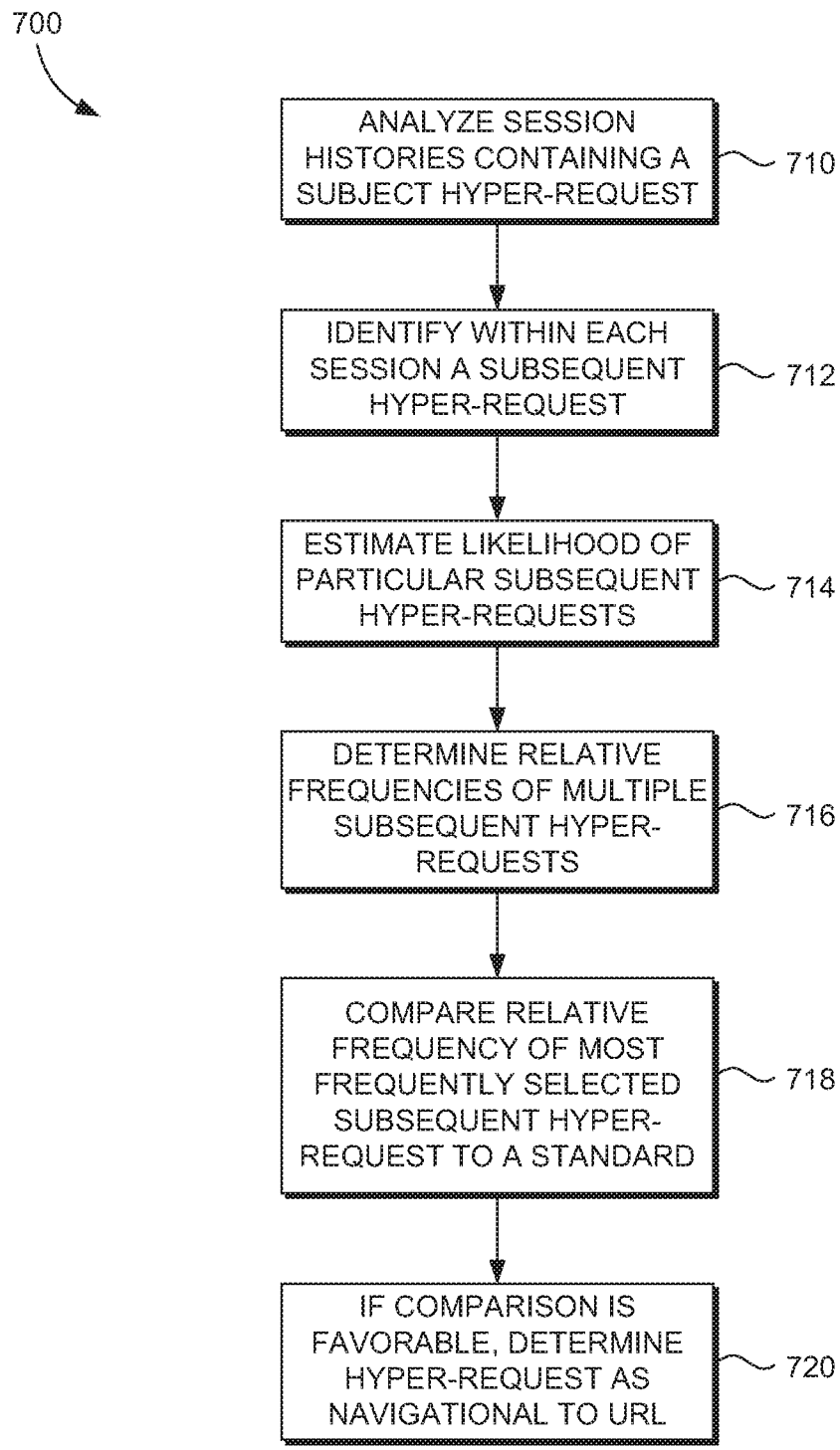
FIG. 7 is a flow diagram illustrating a method of establishing a navigational relationship between a hyper-request and an associated URL, in accordance with an embodiment of the invention.

Turning now to FIG. 7, a flow diagram is shown illustrating a method 700 of establishing a navigational relationship between a subject hyper-request and an associated URL. A subject hyper-request is for example a text string representing a search query. As indicated at block 710, session histories containing the subject hyper-request are analyzed. In embodiments, the sessions analyzed are drawn only from a given user. In other embodiments, session data is aggregated from many users. As indicated at block 712, subsequent hyper-requests are identified which follow the subject hyper-request in each session. As indicated at block 714, an estimate is formed of the likelihood that a particular subsequent hyper-request will follow the subject hyper-request, within a subset of the sessions analyzed. This estimate is formed for example, by forming an estimate of the number of times that a given URL from a plurality of search engine results is selected, divided by the total number of times that any one of the plurality of search results is chosen. As indicated at block 716, the relative frequency of multiple subsequent hyper-requests is determined by comparing estimated likelihoods. In embodiments, the maximum likelihood subsequent hyper-request, or the most frequent subsequent hyper-request is determined. As indicated at block 718, the relative frequency of the most frequently selected subsequent hyper-request is compared to a standard, for example, by comparing the likelihood estimate of the most frequently selected to a threshold. In embodiments, a threshold of 40-50% may be utilized. If the likelihood exceeds the threshold, then the most frequent URL is chosen in a predominate fraction of the analyzed session histories. Therefore, as indicated at block 720, the subject hyper-request is determined to be navigational to the URL of the most frequent subsequent hyper-request. Accordingly, the subject hyper-request and the URL are determined to be navigationally related.

Figure 8:
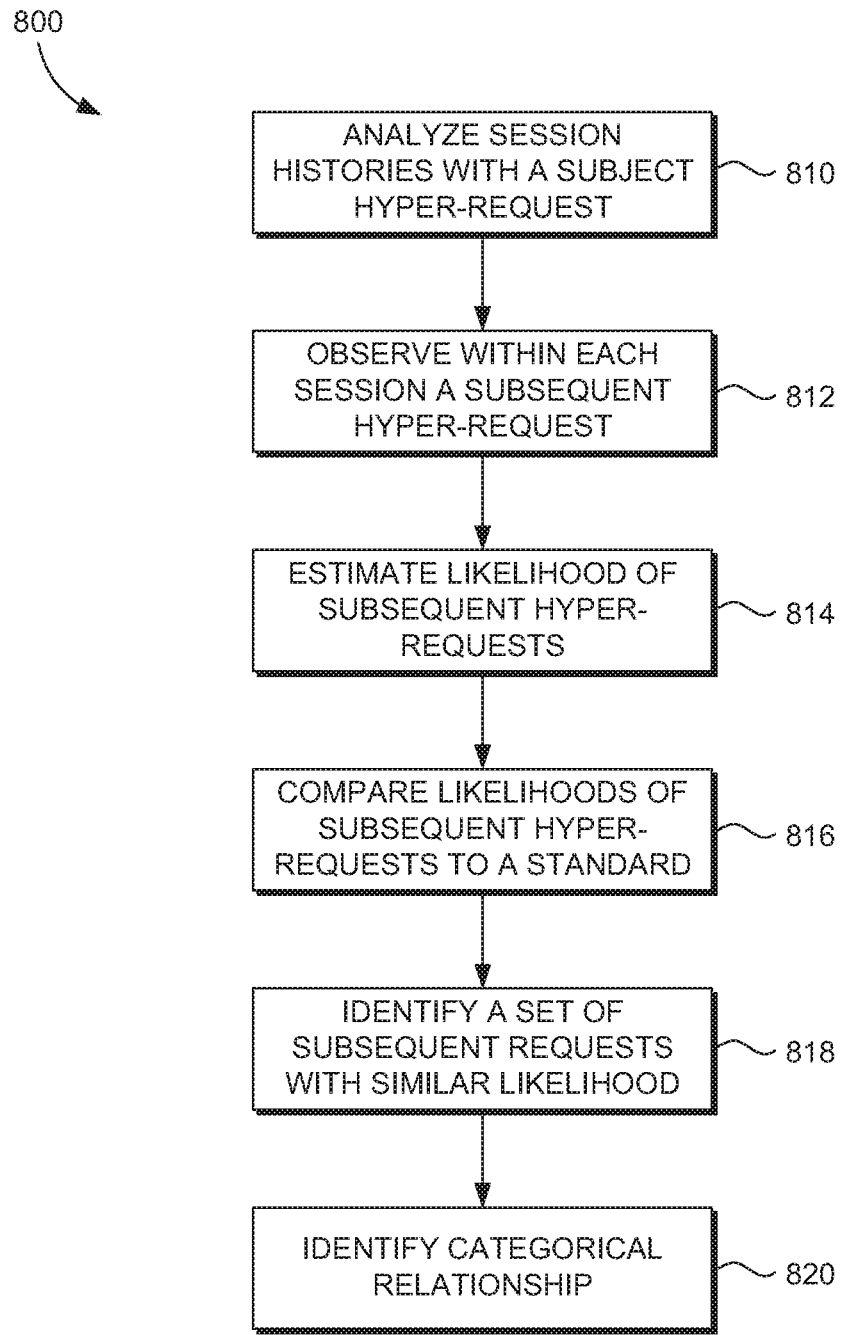
FIG. 8 is a flow diagram illustrating a method of establishing a categorical relationship between a first and second hyper-request, in accordance with an embodiment of the invention.

Turning now to FIG. 8, a flow diagram is shown illustrating a method 800 of establishing a categorical relationship between a first and second hyper-request. A subject hyper-request is, for example a text string representing a search query. As indicated at block 810, session histories containing the subject hyper-request are analyzed. In embodiments, the sessions analyzed are drawn only from a given user. In other embodiments, session data is aggregated from many users. As indicated at block 812, subsequent hyper-requests are identified which follow the subject hyper-request within each session. As indicated at block 814, estimates are formed of the likelihood of subsequent hyper-requests that follow the subject hyper-request. These estimates are formed, for example, by forming an estimate of the number of times that a given URL is selected from a plurality search engine results, divided by the total number of times that any one of the plurality of search results is chosen. As indicated at block 816, the likelihoods of the subsequent hyper-requests are compared to a standard. If there are many subsequent hyper-requests that fall within an interval of the standard, then the subject hyper-request is determined to be a parent category. When there are 10 URLs, "many" may be 2, 3, or more, and the standard may be for example 3%, 5.5% or 6%. In embodiments, a standard of 3%, and a multiplicative interval of 3 may be used, so that when there are many likelihoods between 1% and 9%, the subject hyper-request is determined to correspond to a parent category. In other embodiments, a multiplicative interval of 5 may be used. In yet other embodiments, a standard of 6% and an additive interval of 5 may be used, so that when there are much likelihood between 1% and 11%, the subject hyper-request is determined to correspond to a parent category. In still other embodiments, a standard of 5.5% and an additive interval of 4.5% may be utilized, so that when there are much likelihood between 1% and 10%, then the subject hyper-request is determined to correspond to a parent category. As indicated at block 818, a set of subsequent hyper-requests are determined to be daughters to the parent. In embodiments, all hyper-requests having likelihood within an interval of the standard are identified to be daughters to the parent category. In other embodiments, all subsequent hyper-requests having likelihood below a threshold such as 40% are identified to be daughters to the parent category. As indicated at block 820, the subject hyper-request is determined to be a parent category when a sufficient number of similar likelihood subsequent hyper-requests have been found.

Figure 9:
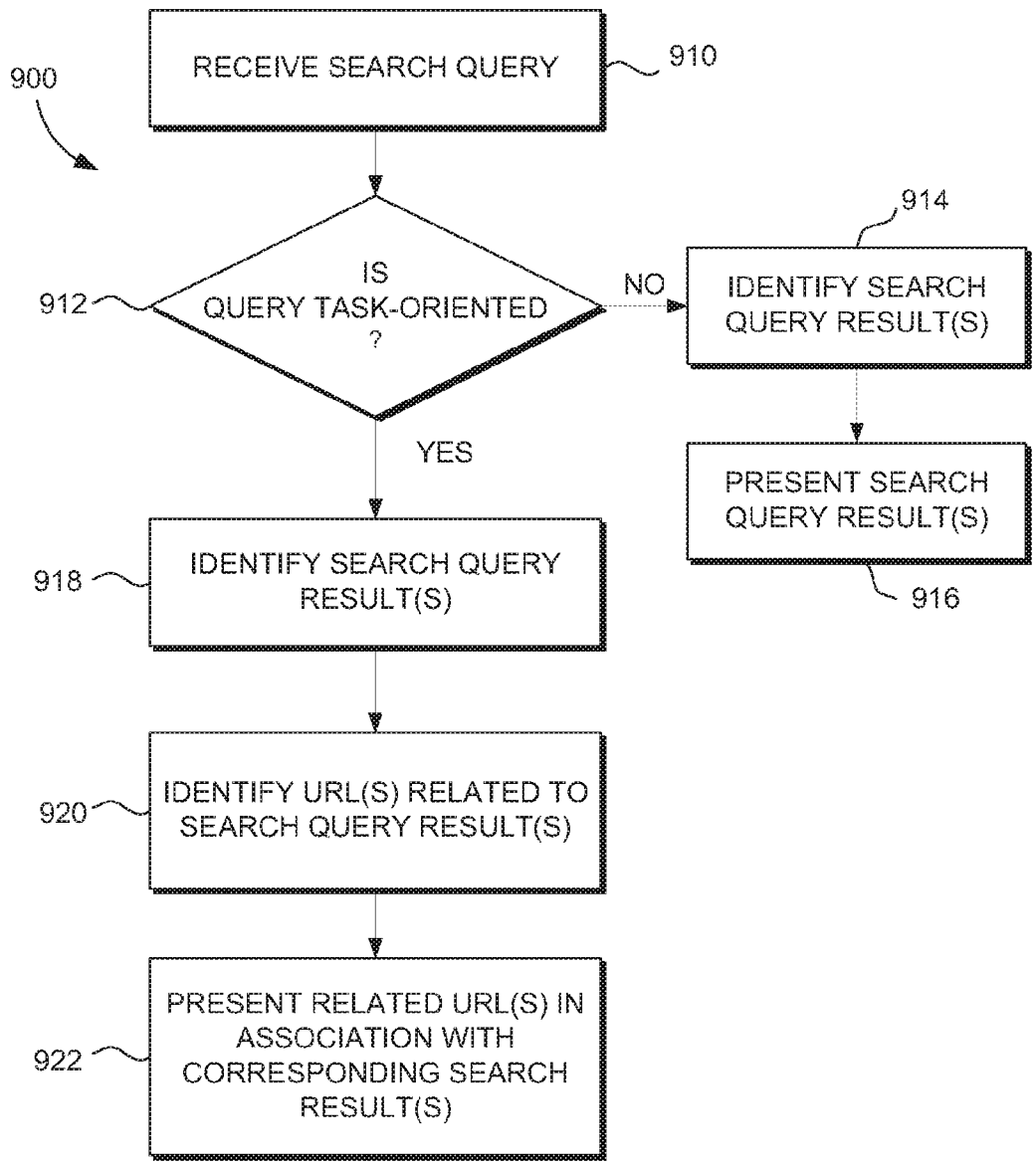
FIG. 9 is a flow diagram illustrating exemplary data flow for compiling related URL results, in accordance with an embodiment of the invention.

Turning now to FIG. 9, there is depicted a schematic diagram 900 for providing URLs related to search results, in accordance with embodiments of the present invention. Initially, as indicated at block 910, a search query is input by a user. Upon receipt of the search query, it is determined whether or not the received search query is a task-oriented search query. This is indicated at block 912. If it is determined that the received search query is not a task-oriented search query, search results are identified that satisfy the received search query, as indicated at block 914, and presented to the user, as indicated at block 916. If, however, it is determined that the received search query is a task-oriented search query, at least one search result that satisfies the received search query is identified, as indicated at block 918. Also identified, as indicated at block 920, is one or more URLs related to the at least one search result. As indicated at block 922, the identified URL(s) are presented to the user in association with the at least one search result to which it is related, to aid the user in performing his or her task.

A task being performed by the user may be broadly defined as a goal that is determined to be likely pursued by the user who issues a particular search query. A task in a broad definition may span several sessions or even several years, including, e.g., reading news about a certain topic related to a business, searching for a forgotten title of a movie, shopping for groceries, and the like. A task may also be limited to a single session such as searching for a particular ingredient that is not available locally, thus terminating with the location of a site that carries the ingredient, so that a session comprises only hyper-requests from the same user within a span of about 10 to 20 minutes. A task may also be limited to a subtask within a session task such as assembling a list of alternative URLs where an item might be purchased, or navigating to a single site to check if that site carries the product. In embodiments, the related URL data may be populated by an off-line process that performs a clustering algorithm comparing the text of the page corresponding to a given URL returned as a result of the search query to that contained in other pages that have been indexed. In embodiments, the related URL data may be populated using the text of the user search query or the search results as an index into compiled related URL data. In embodiments, user data may be utilized, which user data includes data outside of the present search query to determine if there are sufficiently related URLs to one or more of the search results identified for the task-oriented search query. In embodiments, user data may include prior hyper-requests from the same user who submitted the present search query, either from the current session, prior related sessions, or all prior data. In embodiments, user data may include all sessions of all users world-wide, users of a certain browser, users of a certain search engine, users of a certain location such as a country, or data from queries having words in common with the present search query. In embodiments, related URL data is created from the user data in an off-line, real-time, or near real-time process. Any and all such variations, and any combination thereof, are contemplated to be within the scope of embodiments of the present invention.

Figure 10:
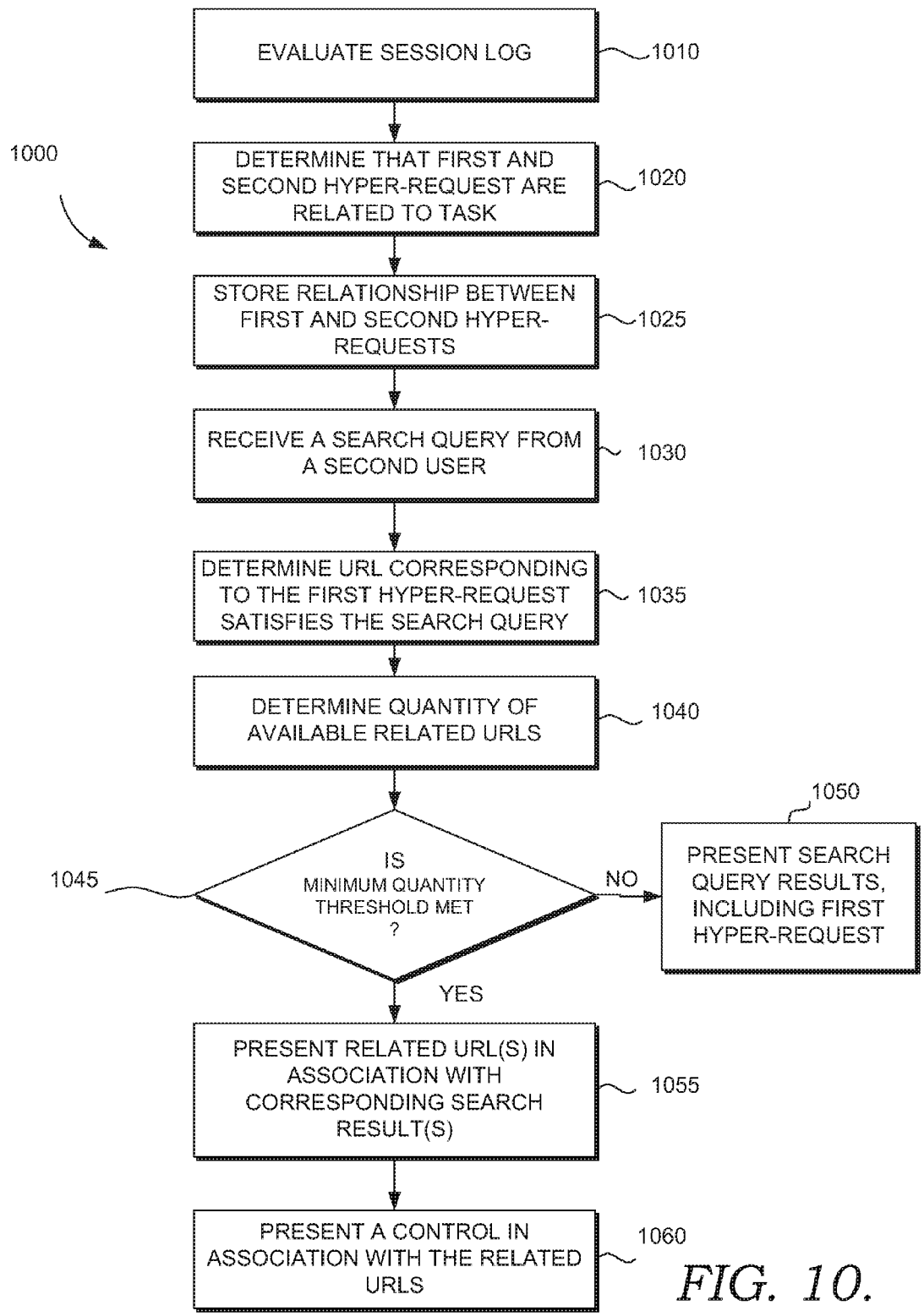
FIG. 10 is a flow diagram illustrating a method for determining and presenting URLs related to search results, in accordance with an embodiment of the invention.

Turning now to FIG. 10, a flow diagram is shown illustrating a method 1000 for determining and presenting URLs related to search results. As indicated at block 1010, a session log is evaluated that contains a plurality of hyper-requests executed by a first user. In embodiments, only a single session is considered in making the evaluation. In embodiments, multiple sessions of the same user are considered in making the evaluation. In embodiments, multiple sessions of multiple users are considered in making the evaluation. Any and all such variations, and any combination thereof, are contemplated to be within the scope of embodiments of the present invention. As indicated at block 1020, it is determined based upon receipt of a first hyper-request and a second hyper-request, that the user's search queries are related to the performance of a particular task. Embodiments of the determination in block 1020 are described more fully in conjunction with FIGS. 6, 7, 8, 11, 12, 14, 15 and 16.

At a high level, a determination is made based on a session signature that a first hyper-request and a second hyper-request are likely related to the same task that is performed by the first user. A session signature is a pattern of things that happen within a session, e.g., a user selecting a first hyper-request within a certain period of time of selecting a second hyper-request. The task, as mentioned above is the goal that is likely to be associated with the first and second hyper-requests. For example, where the second hyper-request is a search query with the string "target shoes," the task may be finding a hyper-link at the "target.com" site associated with "kids' shoes." In this embodiment, the first hyper-request is a web page from "target.com" that has a hyper-link for kids' shoes, such as the web page corresponding to the URL "http://www.target.com/Kids/b?%5Fie=UTF8&node=1041972." In accordance with this example, if the first hyper-request was a search query for "Kmart shoes," which was also entered by the first user in the same session in which a hyper-request was made for "target shoes," it may be determined that the first user is likely performing the task of comparison shopping for shoes at retail stores. In accordance with embodiments hereof, tasks may include, by way of example only, visiting related sites, looking for streaming videos online, comparison shopping, social networking, researching a topic, reading news, reviewing blogs, searching for reviews, or booking a trip. URLs determined to be related to such task may include URLs gleaned from the current user's search activity, URLs gleaned from all user's search activity, URLs gleaned from all users' browser activity, and the like.

As a result of processing the session log, related URLs and task information are stored as user data or as related URL data. This is indicated at block 1025. As discussed more fully in conjunction with FIGS. 14A and 14B, if session data related to the received text string contains a signature indicating a task, then a first and second hyper-request are determined to be related to a task. For example, if the query string is classified as navigational to a URL, this URL is studied to see if there are related sites for this URL. In embodiments, search results are identified as a result of the input search query, and each returned search result URL is examined to identify potentially related URLs.

Continuing with FIG. 10, as indicated at block 1030, a search query is received, e.g., by search engine server 204 of FIG. 4, from a second user. In embodiments, the search query is received as a result of the second user operating an I/O component such as a keyboard. Exemplary I/O components also include user I/O devices or pointing devices such as a mouse, track-ball, touch screen or control stick to receive user input for activating controls in a graphical user interface. Exemplary I/O components also include display devices such as speakers, screens, video monitors. Exemplary I/O components further include graphics cards and display devices associated graphics cards which also may internal have memory. Exemplary I/O components additionally include network cards such as LAN or WAN cards that couple to a network for remote storage associated with a search engine server. In embodiments, the search query is received from the keyboard as each character is typed, so that a set of related URLs may be displayed in an auto-suggest drop-down box (e.g., drop down box 1750 of FIG. 17). In embodiments, the search query may be received by using the arrow keys to select an auto-suggestion menu entry (such as entry 1751 or 1752 of FIG. 17) when only a portion of the search query has been input. In embodiments, the search query is received as the result of typing it into a search box, such as search box 1830 of FIG. 18. In embodiments, the text string is received as a result of selection of a hyper-link using an I/O device such as a mouse, which results in text being sent to a search engine server (e.g., search engine 204 of FIG. 4) which indicates the contents of the search query represented by a displayed description associated with the corresponding hyperlink.

Continuing with FIG. 10, it is next determined that the URL corresponding to the first hyper-request satisfies the search query received from the second user. This is indicated at block 1035. As indicated at block 1040, a quantity of URLs related to the first hyper-request are determined. In the illustrated embodiment, it is determined if a pre-determined minimum number of related URLs is available for presentation, as indicated at block 1045. If a pre-determined minimum number of related URLs is not available, related URL processing terminates resulting in presentation of only search results satisfying the search query. This is indicated at block 1050. For example, in embodiments, a minimum number of related sites may be set at three. If there were two or fewer related URLs, a related URLs display area would be omitted from the search results page, e.g., SERP 1999 of FIG. 19. In other embodiments, no minimum number of related URLs is required.

As indicated at block 1055, if it is determined that a pre-determined minimum number of related URLs is available, the related URL(s), or an identifier there for, are presented in association with the corresponding search result(s). In embodiments, the presented related URL(s) are selectable links, selection of which navigates the user directly to the corresponding web page, that is, without any intervening additional search result pages, such that the second user may readily execute the first hyper-request, thus aiding the second user in performing his or her likely task. Such presentation of related URLs may include an auto-suggested menu item with a related site string (such as 1752, 1753, or 1754 of FIG. 17) that may be selected through keyboard position arrows from an auto-suggest search box (e.g., search box 1750 of FIG. 17). Such presentation of related URLs may further include an embedded portion of a SERP display area (e.g., display area 1850 of FIG. 18). Still further, such presentation of related URLs may include displayed hyper-links (such as hyper-links 1851, 1852, 1853 of FIG. 18), each indicating the text of a related search query. In embodiments, such presentation is via a browser (e.g., browser 520 of FIG. 5) or via an API within a browser. In embodiments, such presentation is via an agent (such as data management agent 530 of FIG. 5) that hosts a browser. In embodiments, such presentation is via an operating system (e.g., operating system 536 of FIG. 5) or via an application (such as local application 527 of FIG. 5).

In embodiments, a control is presented in association with at least one of the related URLs, as indicated at block 1060. A control facilitates performance of an operation related to a task likely to be performed by the user. That is, a control provides additional information and/or functionality with respect to the associated related URL. For example, if the task is comparison shopping, an embodiment of a comparison shopping control is a search box that receives a query to search for results over all related comparison shopping URLs and associated sites presented in association with a particular search result. As another example, if the task is reading news, an embodiment of a news reading control is a search box that receives a query to search over all related news reading URLs and associated sites that are presented in association with a particular search result. As another example, if the task is reading world news online, an embodiment of a news reading control is presentation of headlines for the most popular world news online stories at one or more of the world news related URLs and associated sites. As another example, if the first hyper-request is "target shoes", a presented control would permit querying of one or more URLs and associated sites related to a particular search result for the received query and to shoe shopping. In some embodiments, a single URL and associated site is searched. In some embodiments, all related URLs and associated sites are searched. In embodiments, controls are only presented when there are at least a minimum number of related URLs over which to perform the search. In addition to controls, other information/data associated with the site associated with a related URL may be presented as well. For instance, in association with a related URL associated with an airline, a customer service telephone number, hours of operation, or an image may also be presented.

Figure 11:
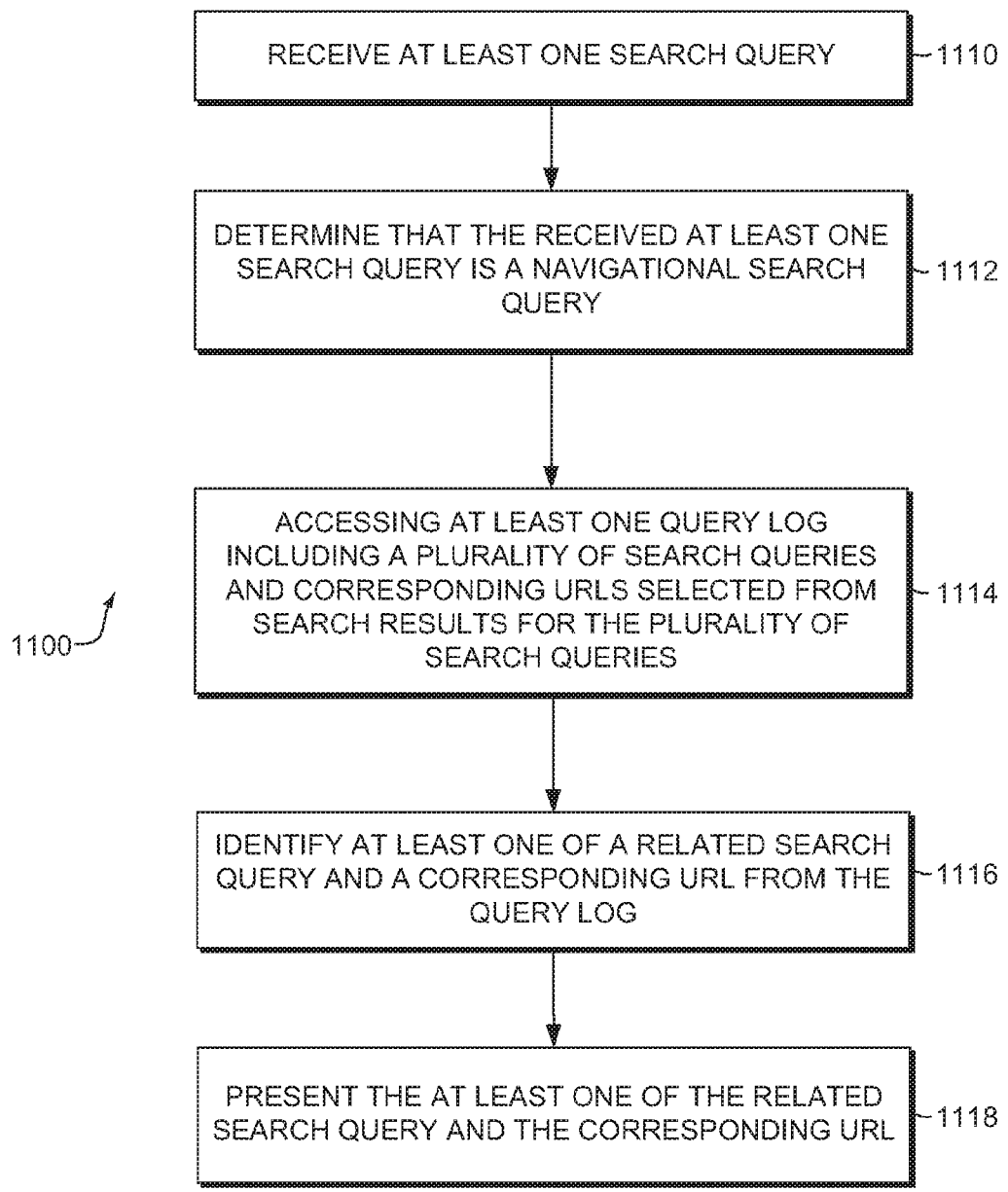
FIG. 11 is a flow diagram illustrating a method for presenting a link to related web sites in response to receiving a search query, in accordance with an embodiment of the invention.

Turning now to FIG. 11, a flow diagram depicting a method 1100 of presenting a link to at least one related search query and corresponding URL in response to receiving at least one navigational search query is presented. Related search queries are those that are similar enough to the URLs corresponding to navigational search queries that a user has a likelihood of finding the information useful and/or relevant. For instance, if the navigational search query is directed to a particular major consumer electronic retailer, related search queries might be those directed to other electronic retailers.

The method begins at block 1110 with the receiving of at least one search query. The search query may be entered, e.g., into one of the user devices 206, 208, and 210 of FIG. 4, and communicated to the search engine server 204 through the network 202. Further discussion of FIG. 11 will refer to a single search query being received in block 1110, although multiple search queries may be received in block 1110.

At block 1112, the search query received in block 1110 is analyzed to determine if it is a navigational search query. Methods described in relation to FIG. 6 are utilized to determine whether the search query is a navigational search query and reference will therefore be made to FIG. 6. In general, the process of categorizing a search query as a navigational search query begins by determining the number of instances that a particular URL was selected in response to a particular search query that did not result in a subsequent click on a different URL in the search results is identified. A particular search query within the meaning of FIG. 11 is the search query received in block 1110 and may be a search query that is received, e.g., from a user device 206, 208, or 210 of FIG. 4 by the search engine server 204. Next, the query log is analyzed to determine how many times a particular URL was selected in response to the particular search query. Although not depicted in FIG. 11, the portion of the method recited in relation to block 1114 may be carried out for each URL that was selected in search results generated for that particular search query. In this manner, each URL that was selected in the search results may be a particular URL for the particular search query.

Simply put, although not explicitly depicted in FIG. 6, the methods recited in blocks 612, 614, 616, and 618 may be repeated for each URL that was selected in response to the particular search query. After completing the iterations for each URL that was selected, each URL will have been a particular URL at one time in the iterative process.

A determination is then made of the number of instances that any URL was selected in response to the search query received at block 1110. This determination is made by analyzing the entries of the query log in which the particular search query was issued. The number of distinct URLs selected in response to the particular search query can then be determined.

Further, the numbers identified and determined in blocks 612 and 614 are compared and a comparison value is generated. The comparison value can take the form of a ratio. If the ratio of the number of instances identified in block 612 to the number determined in block 614 exceed a predefined percentage, the particular search query is determined to be a navigational search query in block 1112. The predefined percentage may vary considerably in practice and be regularly adjusted to provide optimal results. In some embodiments of the invention the percentage may be in the 40-50% range. Although it should be understood that in other embodiments of the invention the percentage may vary significantly based on any number of factors. Those factors may include, but are not limited to: the total number of entries of the query log, the number of URLs selected in response to the particular search query, or the number of instances that the particular URL was selected in response to the particular search query. Accordingly, the range of percentages may vary considerably based on any number of factors.

In block 1114, a query log containing at least one such query is accessed. For purposes of discussion, it will be assumed that one query log is accessed, although it should be recognized that multiple query logs may be accessed in accordance with embodiments of the invention. As discussed above in regard to FIG. 3, a query log generally contains the following pieces of information for each search query received: the identity of the user device from which the search query was received, the date and time of the reception or issuance of the search query, the elements of the search query, the URL(s) selected in response to the search query, and the date and time on which the URL(s) were selected in response to the search query. More or less information may be included in the query logs, according to varying embodiments of the present invention.

In block 1116, at least one related search query and a corresponding URL is identified. Related queries and corresponding URLs may be identified by analyzing the query log to determine queries issued by a user within a predetermined period of time from the same user issuing the navigational query. A set may then be generated of prospective related search queries and corresponding URLs. The search queries and corresponding URLs in the set may then be analyzed to determine if they are navigational search queries and related URLs. In some embodiments of the invention, queries and URLs may be filtered from the set if they are not navigational search queries and corresponding URLs. A filtered set is thereby generated that contains related search queries and corresponding URLs that are also navigational search queries. This filtered set, or some portion thereof, can then be presented in association with the navigational search and corresponding URL.

Alternative embodiments of the invention may retain the queries and URLs in the set, regardless of the status of the query as a navigational search query. In these embodiments, a determination may not even be made as to whether or not the search queries and URLs are navigational search queries and corresponding URLs.

At block 1118, at least one of the related search query and the corresponding URL link is presented. The at least one of the related search query and corresponding URL may be presented in association with the corresponding URL for the navigational search query in the search results. The at least one of the related search query and corresponding URL may be presented directly beneath the link to the corresponding URL for the navigational search query. In addition, multiple links to related search queries and/or navigational search queries may be displayed in conjunction to the corresponding URL for the navigational search query. A visual depiction of the arrangement of the link to related web sites is presented in FIG. 13 and will be discussed to a greater extent in conjunction therewith. It should be understood however that only the related search query or only the corresponding URL may be presented with the navigational search query. In addition, both the related search query and corresponding URL may presented in association with the navigational search query.

Figure 12:
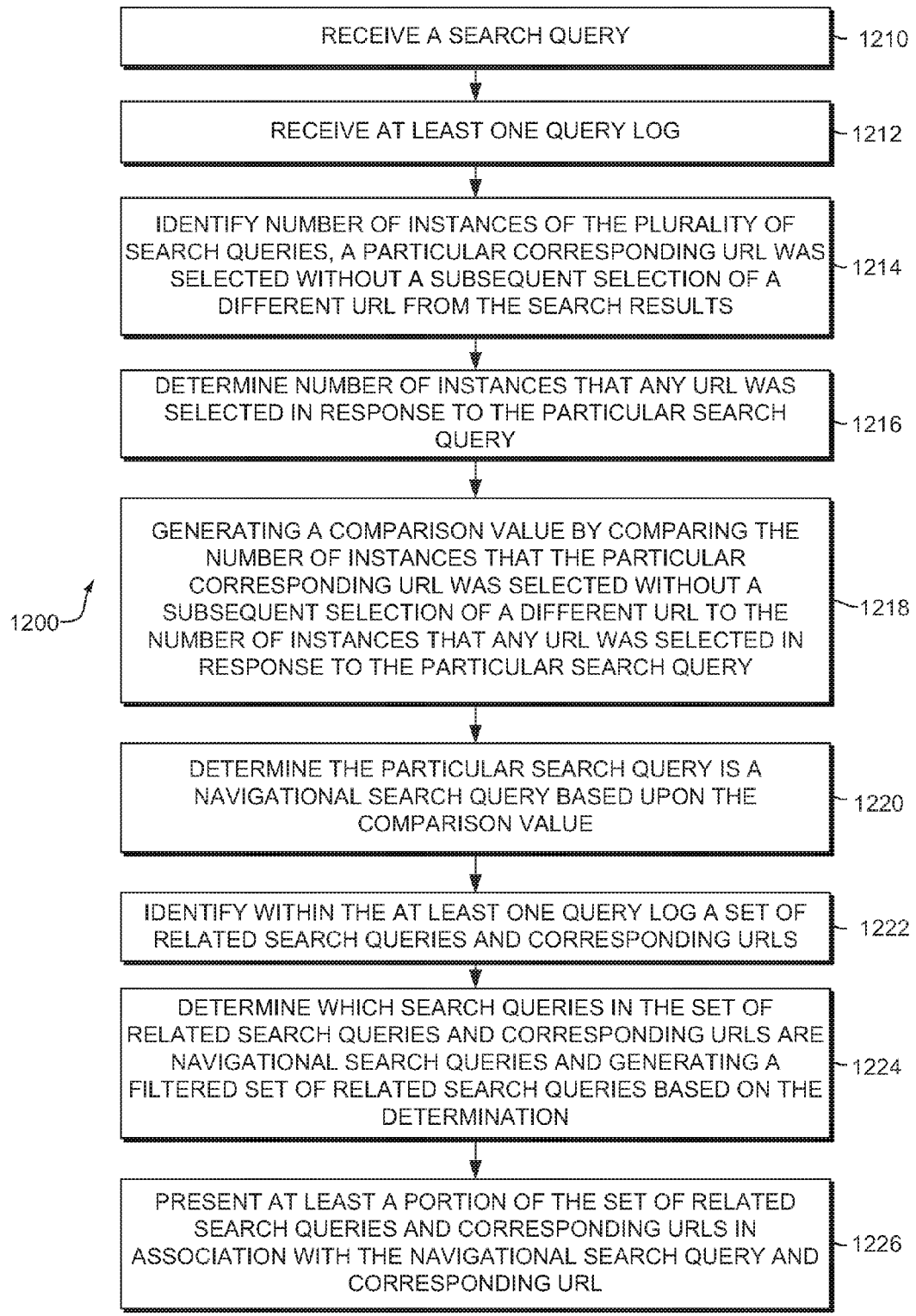
FIG. 12 is a flow diagram illustrating a method, in accordance with an embodiment of the invention, for identifying a navigational search query and displaying related web sites in conjunction with a URL corresponding to the navigational search query.

Turning now to FIG. 12, a depiction is presented of a flow diagram for a method 1200 of identifying a navigational search query and displaying a related search query and/or corresponding URL in association with a URL corresponding to the navigational search query is presented, according to one embodiment of the invention.

The method begins in block 1210 with the receiving of a search query. The search query may be received, e.g., from any of user devices 206, 208, and 210 of FIG. 4 after being communicated through network 202 to search engine server 204.

A query log is then received in block 1212, in a similar fashion related in conjunction with block 610 of FIG. 6 and block 1112 of FIG. 11. For purposes of discussion, it will be assumed that one query log is received, although it should be recognized that multiple query logs may be received in accordance with embodiments of the invention. While block 1212 references the receiving of a query log, the term 'receiving' should be understood to encompass the generation of a query log within, for example, the search engine server 204 of FIG. 4. In this manner, the query log may be 'received' by a different component of the search engine server 204 of FIG. 4 than the component that generated the query log. As discussed above in regard to FIG. 3, a query log generally contains the following pieces of information for each search query received: the identity of the user device from which the search query was received, the date and time of the reception or issuance of the search query, the elements of the search query, the URL(s) selected in response to the search query, and the date and time on which the URL(s) were selected in response to the search query. More or less information may be included in the query logs, according to varying embodiments of the present invention.

In block 1214, the number of instances that, in response to a particular search query of the plurality of search queries, a particular corresponding URL was selected without a subsequent selection of a different URL from the search results.

In accordance with block 1216, the query log is analyzed to determine the number of instances that any URL was selected in response to the particular search query. This determination is made by analyzing the entries of the query log in which the particular search query was issued. The number of distinct URLs selected in response to the particular search query is then determined. Although not depicted in FIG. 12, the portion of the method recited in relation to block 1216 may be carried out for each URL that was clicked upon in search results generated for the search query. In this manner, each URL that was clicked upon in the search results may be a particular URL for the particular search query.

Simply put, although not explicitly depicted in FIG. 12, the methods recited in blocks 1214, 1216, 1218, and 1220 may be repeated for each URL that was clicked upon in response to the search query received in block 1210. After completing the iterations for each URL that was selected, each URL will have been a particular URL at one time in the iterative process.

In block 1218, a comparison value is generated by comparing the number of instances that the particular corresponding URL was selected without a subsequent selection of a different URL to the number of instances that any URL was selected in response to the particular search query to generate a comparison value.

In block 1220, the particular search query is determined to be a navigational search query based upon the comparison value. This comparison value can take the form of a ratio. If the ratio exceeds a predefined percentage, the search query can be determined to be a navigational search query. The predefined percentage may vary considerably in practice and be regularly adjusted to provide optimal results. In some embodiments of the invention the percentage may be in the 40-50% range. Although it should be understood that in other embodiments of the invention, the percentage may vary significantly based on any number of factors. Those factors may include, but are not limited to: the total number of entries of the query log, the number of URLs selected in response to the particular search query, or the number of instances that the particular URL was selected in response to the particular search query. Accordingly, the range of percentages may vary considerably based on any number of factors.

In block 1222, a set of related search queries and corresponding URLs is identified within the at least one query log. Related queries and URLs may be identified by analyzing the query log to determine queries issued by other users within a predetermined period of time from when they issued the same user issuing the navigational query. A set may then be generated of prospective related queries and URLs.

At block 1224, a determination is made as to which queries and URLs in the set are navigational search queries and corresponding related URLs. Although not depicted in FIG. 12, this determination is made by utilizing methods presented in blocks 1214, 1216, and 1218. Queries and URLs are then removed from the set if they are not navigational search queries and corresponding URLs. A filtered set is thereby generated, containing only related search queries and corresponding related URLs that are also navigational in nature.

At least a portion of the set of related queries and URLs are presented to the user in association with the navigational search query and corresponding URL in block 1226. The set may be presented directly beneath the corresponding URL for the navigational search query. A visual depiction of the arrangement of the link to related web sites is presented in FIG. 13 and will be discussed to a greater extent in conjunction therewith.

Figure 13:
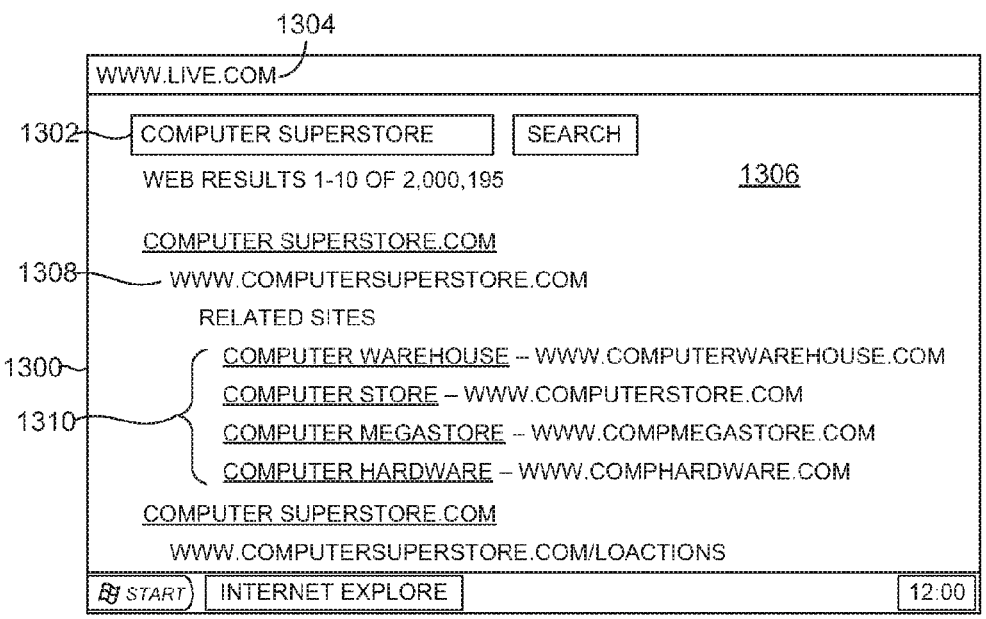
FIG. 13 is a screen shot of an exemplary search results web page for a navigational search query, according to one embodiment of the invention.

Turning now to FIG. 13, a depiction of an exemplary screen shot of a search results web page for a navigational search query is presented, according to one embodiment of the invention. The user interface 1300 is a display of a user device, e.g., user device 206, 208, or 210 of FIG. 4. An internet web browser 1304 is depicted, along with a search results web page 1306. The navigational search query "Computer Superstore" 1302 is presented as well. The corresponding URL 1308 of "www.computersuperstore.com" is presented as the corresponding URL to the navigational search query 1302. Immediately beneath the corresponding URL 1308 are a number of related search queries 1310. Although not depicted in FIG. 13, the related search queries 1310 may be displayed in a different font than the corresponding URL 1308, or they may also be displayed in a different text color than the corresponding URL 1308. FIG. 13 is presented as an example only, and many different configurations in accordance with alternative embodiments of the invention are available for displaying the related search queries in conjunction with the corresponding URL of the navigational search query. The depiction in FIG. 13 is not intended to be a definitive example or a preferred embodiment.

Figure 14A:
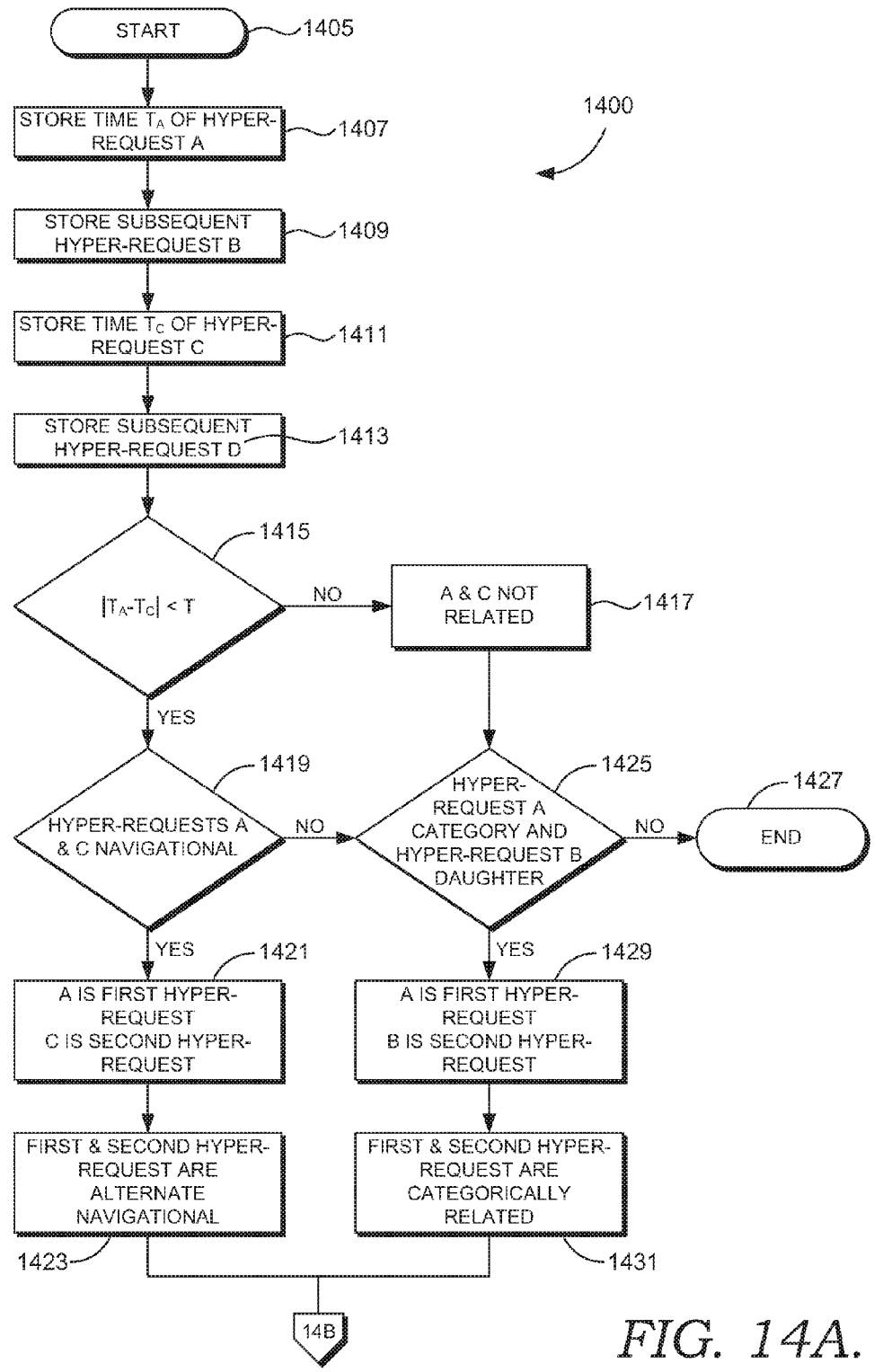
FIG. 14A and FIG. 14B depict a flow diagram illustrating a method for determining that a first and second hyper-request are related to a task based on a signature, in accordance with an embodiment of the invention.
Figure 14B:
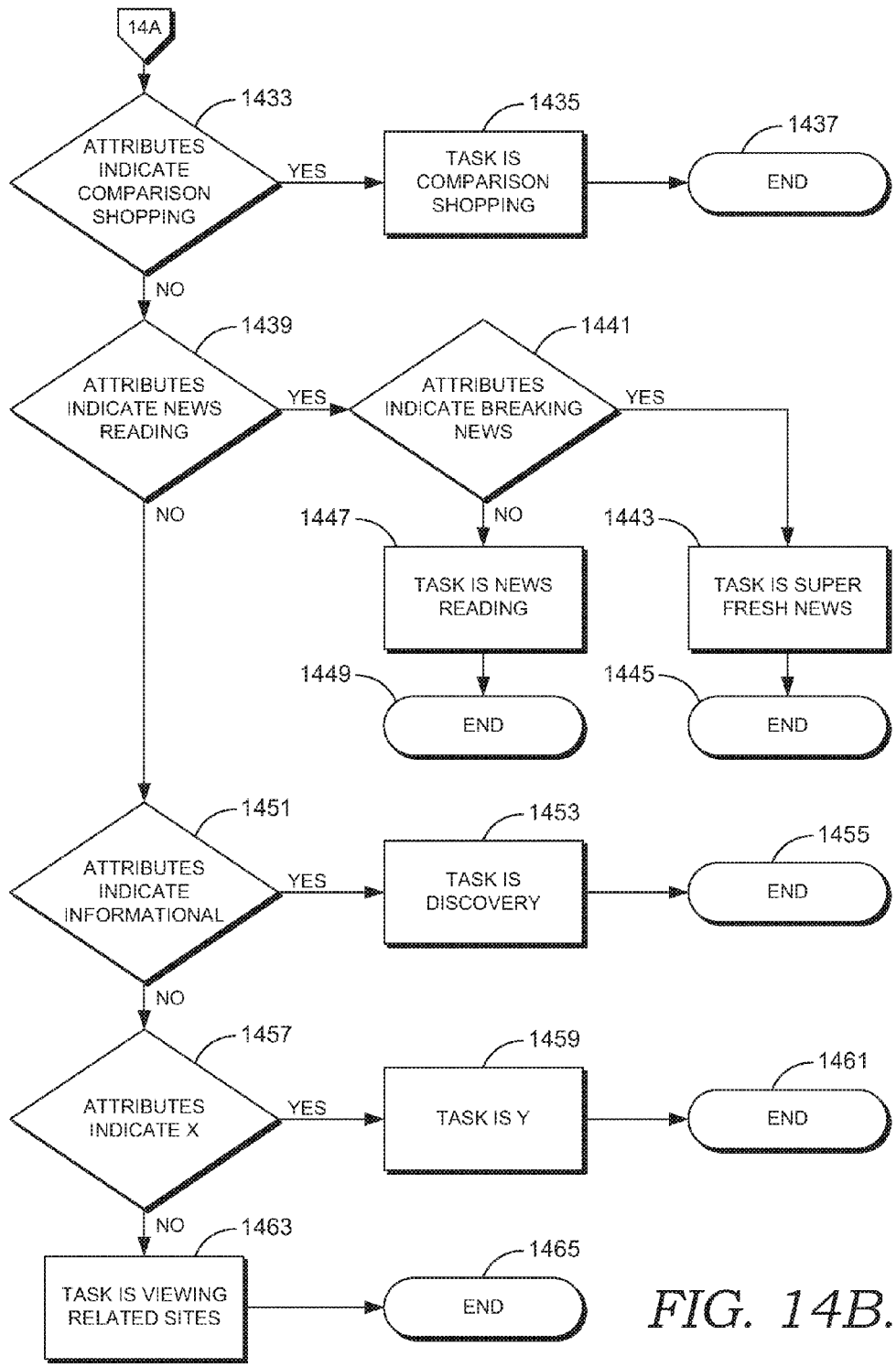

Turning now to FIG. 14A and FIG. 14B, a flow diagram is shown illustrating a method 1400 for determining that two hyper-requests are related to a task based on a signature. The flow begins at block 1405. As indicated at block 1407, a time $T_A$ of a hyper-request, hyper-request A, is stored, for instance in association with a query log such as that shown in FIG. 3. As indicated at block 1409, a selection of a second hyper-request, hyper-request B, is stored. As indicated at block 1411, a time $T_C$ is stored associated with a third hyper-request, hyper-request C. As indicated at block 1413, a selection of a fourth hyper-request, hyper-request D, is stored.

As indicated at block 1415, a comparison is made to determine if times $T_A$ and $T_C$ are within a small time interval T of one another so as to constitute a portion with the same task within a session. If the time interval is too large, it is determined that hyper-requests A and C are not related, as indicated at block 1417, and processing proceeds to block 1425. If hyper-requests A and C are determined to be sufficiently close in time, a decision is made at block 1419 whether or not both hyper-requests A and C are navigational hyper-requests, as for example, by making use of method 700 of FIG. 7. If it is determined that either of hyper-requests A or C is not navigational, a decision is made at block 1425 whether or not hyper-request A represents a parent category and hyper-request B represents a daughter category. If it is determined at block 1425 that hyper-requests A and B do not have a categorical relationship, the method ends, as indicated at block 1427.

If, however, it is determined at block 1419 that both hyper-requests A and C are navigational, processing proceeds to block 1421 where hyper-request A is determined to be the first hyper-request and hyper-request C is determined to be the second hyper-request. As indicated at block 1423, the first and second hyper-requests are determined to be alternative navigational hyper-requests for the same task, so that hyper-request A is determined to be navigational to hyper-request B which is the associated URL, and hyper-request C is determined to be navigational to hyper-request D which is the associated URL. Processing then proceeds from block 1423 of FIG. 14A to block 1433 of FIG. 14B.

When there is an affirmative decision at block 1425 that a categorical relationship exists between hyper-requests A and B, hyper-request A is determined to be the first hyper-request and hyper-request B is determined to be the second hyper-request, as indicated at block 1429. As indicated at block 1431, the first hyper-request is determined to represent a parent category and the second hyper-request is determined to be representative of a daughter category. Processing then proceeds from block 1431 of FIG. 14A to block 1433 of FIG. 14B.

At blocks 1433, 1439, 1451, and 1457, decisions are made concerning the attributes of the first and second hyper-requests. Attributes are for example, data associated with the first hyper-request, data associated with the second hyper-request, data derived from the session history, data derived from aggregated session histories, data returned from or derived from search engine results, or data mined from a taxonomy, as discussed further in connection with FIG. 15. For example, if the first and second hyper-requests are determined to be navigational to URLs categorized in a taxonomy as daughters to the retail store category, then the attributes indicate comparison shopping. As indicated at block 1433, if attributes are determined to indicate comparison shopping, then at block 1435 the task is determined to be comparison shopping, and the method terminates, as indicated at block 1437. If attributes are determined to not indicate comparison shopping at block 1433, processing proceeds to block 1439.

If at block 1439 attributes are determined to indicate news reading, then processing proceeds to block 1441. An example of attributes indicating news reading includes the first hyper-request being a parent category wherein the second hyper-request is associated with a news site. As discussed more fully in connection with FIG. 16, at block 1441 a decision is made whether attributes indicate that the user is looking for breaking news information. If the decision is negative, then processing proceeds to block 1447 where it is determined that the user task is news reading, and the method terminates, as indicated at block 1449. When the decision at block 1441 is affirmative, processing proceeds to block 1443 where the task is identified as super-fresh news reading, and the method terminates, as indicated at block 1445. If it is determined at block 1439 that attributes do not indicate news reading, then processing proceeds to block 1451 where a decision is made whether attributes indicate that the session is informational. An example of attributes indicating that the task is informational is found when the first hyper-request is a parent category, and the second hyper-request is a leaf from a taxonomy site such as en.wikipedia.org. If the decision at block 1451 is affirmative, the task of the user is identified as discovery, as indicated at block 1453, and the method terminates, as indicated at block 1455.

Blocks 1457 and 1459 show that any task identified by attributes may be added to the decision tree. If the attributes indicate X, as indicated at block 1457, then at block 1459 the task is identified as Y. For example, if the attributes indicate alternative navigational requests for video at X, then at Y the task is identified as browsing video. The method then terminates, as indicated at block 1461. In embodiments, the decision boxes are ordered such as 1433, 1439, 1451, and 1457 in decreasing derived revenue. In embodiments, the decision boxes are ordered such as 1433, 1439, 1451, and 1457 in decreasing penalty due to a false negative. In yet other embodiments, multiple tasks are allowed to be identified with the same session.

If the decision at block 1457 is negative, then the task is identified at block 1463 as viewing related sites, and the method terminates, as indicated at block 1465.

Figure 15:
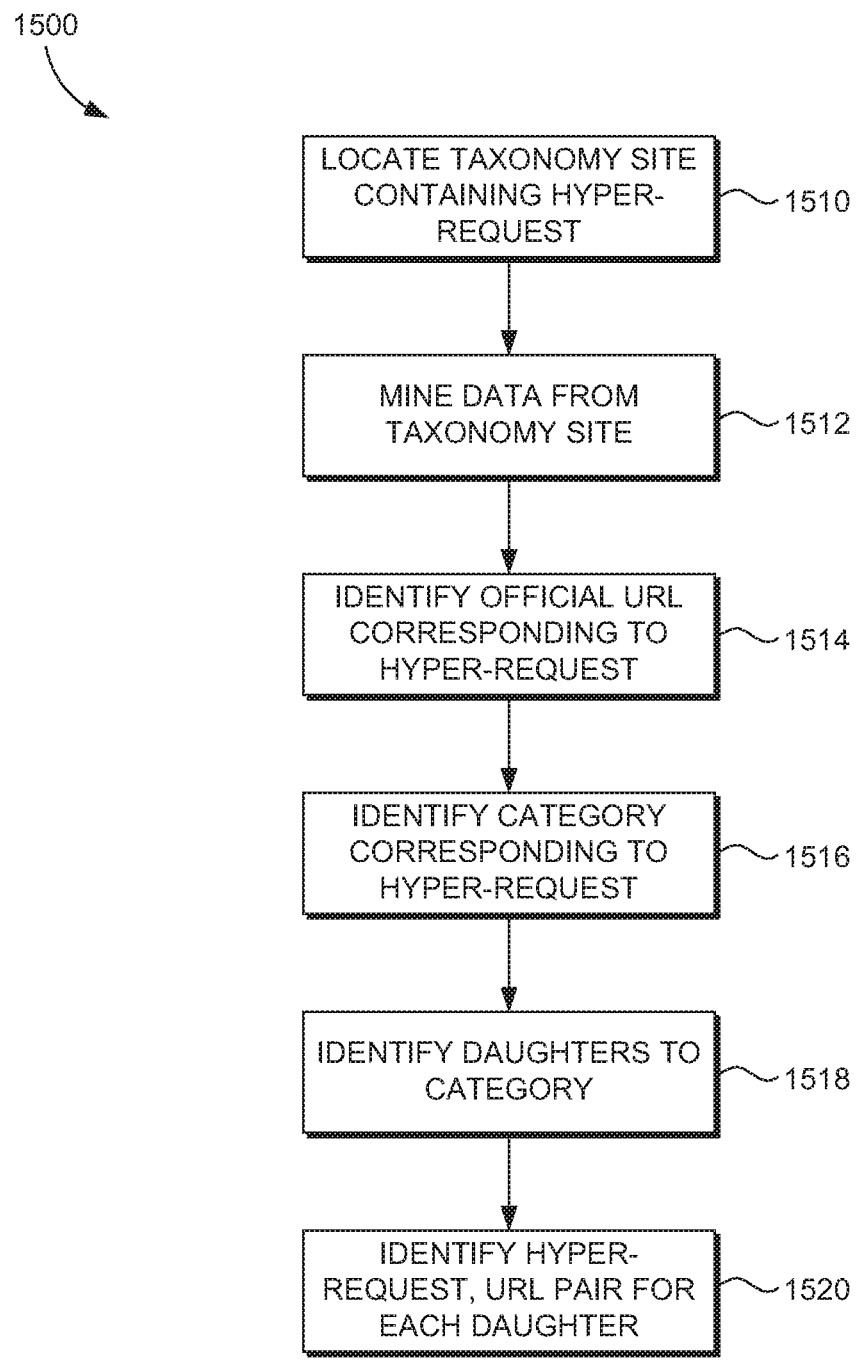
FIG. 15 is flow diagram illustrating a method for using a taxonomy to determine a relationship between two or more hyper-requests, in accordance with an embodiment of the invention.

Turning now to FIG. 15, a flow diagram is illustrated showing a method 1500 for using a taxonomy to determine a relationship between two or more hyper-requests. As indicated at block 1510, a taxonomy site is located containing a hyper-request. Examples of taxonomy sites include en.wikipedia.org, dir.yahoo.com, and dmoz.org. In embodiments, a taxonomy with a directory entry is located by processing search results that contain an entry with a title containing a substantial portion of the hyper-request. As indicated at block 1512, the data from the taxonomy site is mined. As indicated at block 1514, an official URL is identified that corresponds to the hyper-request. In embodiments, this identification is accomplished by finding an external link corresponding to a page having a title that corresponds substantially to the hyper-request. In embodiments, the external link is used in combination with session data to determine that a hyper-request is navigational with respect to a selected URL. As indicated at block 1516, a category is identified corresponding to a hyper-request. An entry in a taxonomy site typically has an index including a parent category and links to other daughters in the same parent category. As indicated at block 1518, the daughters of the category are identified. As indicated at block 1520, each page corresponding to a daughter element is mined for external links to return a hyper-request/URL pair for each daughter within the category. In this way information mined from a taxonomy site is used in combination with session data as discussed in connection with FIGS. 7 and 8 to determine a relationship between two or more hyper-requests.

Figure 16:
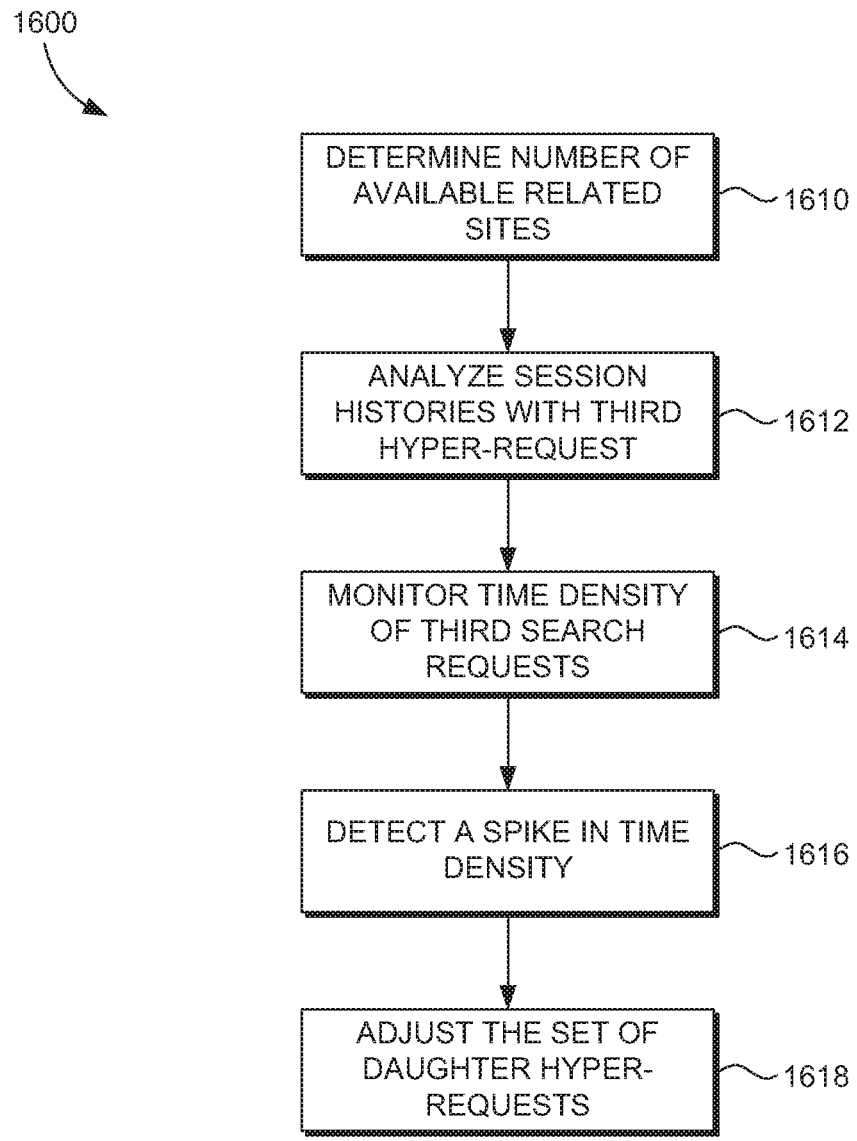
FIG. 16 is a flow diagram illustrating a method for tailoring the related sites when the hyper-request is classified as super-fresh, in accordance with an embodiment of the invention.

With reference to FIG. 16, a flow diagram is shown illustrating a method 1600 for tailoring related sites when a hyper-request is classified as super-fresh. As indicated at block 1610, a number of available related URLs is determined as sources providing news information. For example, suppose that web pages corresponding to requests for cnn, abc, and fox are determined as providing sites in the world news category. In embodiments, related URLs are determined from session data and/or data mined from a taxonomy site. As indicated at block 1612, session histories are analyzed that contain a third hyper-request. For example, suppose that there is a breaking news report concerning a recent tsunami in the Pacific Ocean. The string "tsunami" would represent a third hyper-request in the area that suddenly becomes an important search term related to the breaking news. As also indicated at block 1612, baseline search histories are studied to determine a baseline frequency of the word "tsunami" as a function of time or frequency as a component of search engine queries. Furthermore, recent log histories are monitored as an input to the breaking news evaluation. As indicated at block 1614, the time density of the third hyper-request is monitored. In embodiments, a time window for the request is set and the number of requests within the window is counted. In embodiments, a list is formed of the most frequent hyper-requests, and a comparison to an aggregate list of frequent hyper-requests from the past. Those frequent hyper-requests that have never been on the list are researched and monitored for time density. As indicated at block 1616, a spike is detected in the monitored time density. In embodiments, a spike is detected when the time density increases by a factor of ten. As indicated at block 1618, the set of daughter hyper-requests is adjusted based on the detected spike. In embodiments, a near real-time algorithm for determining daughter hyper-requests included in a related set corresponding to a parent category is switched to when a hyper-request related to that category is determined to be a spiking hyper-request. In embodiments, a time window of 10 minutes, 20 minutes, or 24 hours is set. When news is breaking, it is likely that the best sites for the breaking request evolve quickly. In embodiments, priority is given to data from the recent history, such as the last ten minutes of session history, to quickly determine the most popular, or interesting subsequent hyper-requests. Tools related to the spiking hyper-request may likewise be directed toward recent history.

Figure 17:
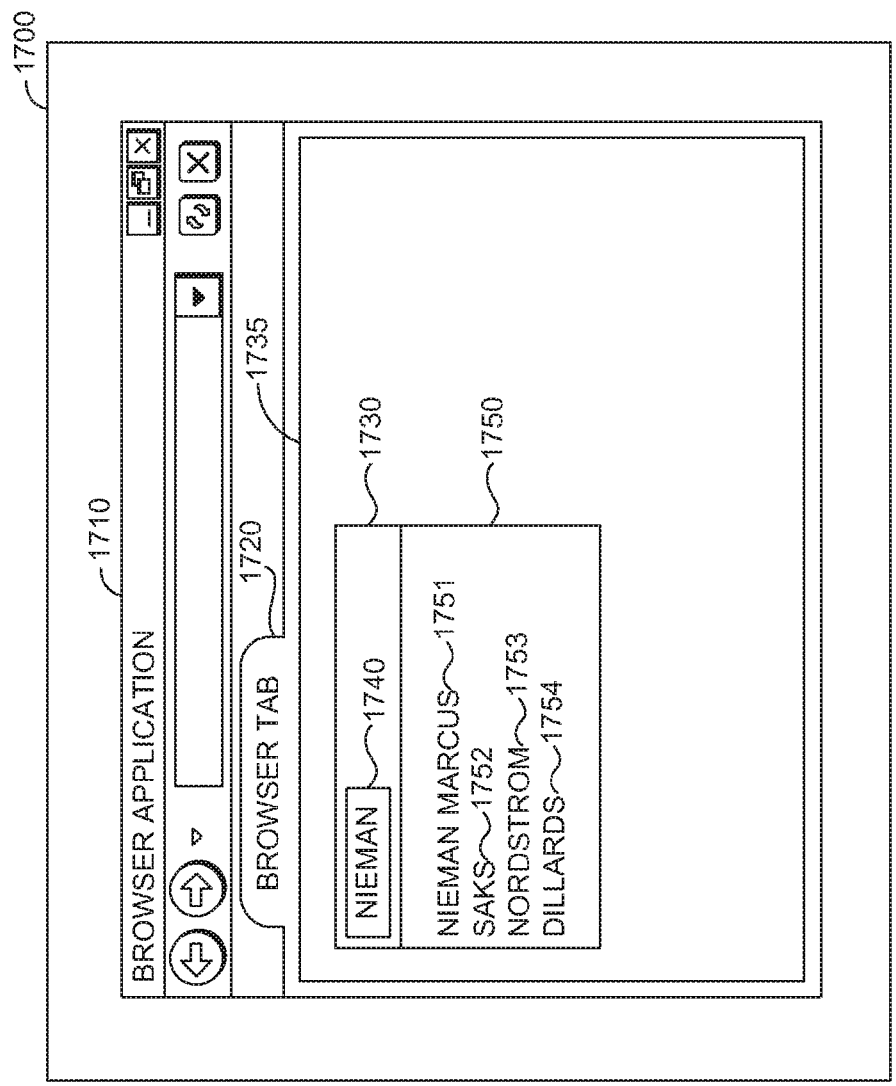
FIG. 17 is an alternative screen shot of an exemplary graphical user interface for presenting a task related hyper-request for selection by a user, in accordance with an embodiment of the invention.

Turning now to FIG. 17, there is depicted therein a screen shot 1700 of an exemplary graphical user interface for presenting a task related hyper-request for selection by a user. Browser tab 1720 displays an element of a user interface, e.g., user interface 518 of FIG. 5, in a search engine query request page 1735. A second hyper-request such as text string 1740 is input into a control 1730, such as a text box, in display area 1735. A second display area such as auto-suggest box 1750, drops down to suggest alternative hyper-requests to the string typed in by the user. Suggested hyper-requests such as 1751, 1752, 1753, and 1754 are selected, for example, by the user depressing arrow keys rather than continuing typing the descriptive string 1740.

Some of the suggested hyper-requests, such as 1751, are suggested through simple string matching searching for a more complete text string based on the entered characters, and perhaps upon relative frequency of entry. Other suggested hyper-requests such as menu items 1752, 1753, and 1754 were determined to be likely associated with the task of comparison shopping based on a session signature in a log of one or more prior sessions. In the example shown, prior sessions that had entered the query string "nieman" were entering a navigational query for the web site of Nieman Marcus." At least one of these sessions that entered a navigational query for Nieman Marcus also entered navigational queries for Saks, Nordstrom and Dillards. Therefore, a related URL determination component, e.g., URL determination component 424 of FIG. 4, determined Saks, Nordstrom, and Dillards to be related sites for the task of comparison shopping to the string "nieman." Display area 1750 is presented substantially at the top of the search engine response page, because it is adjacent to, and below the search box 1730.

Figure 18:
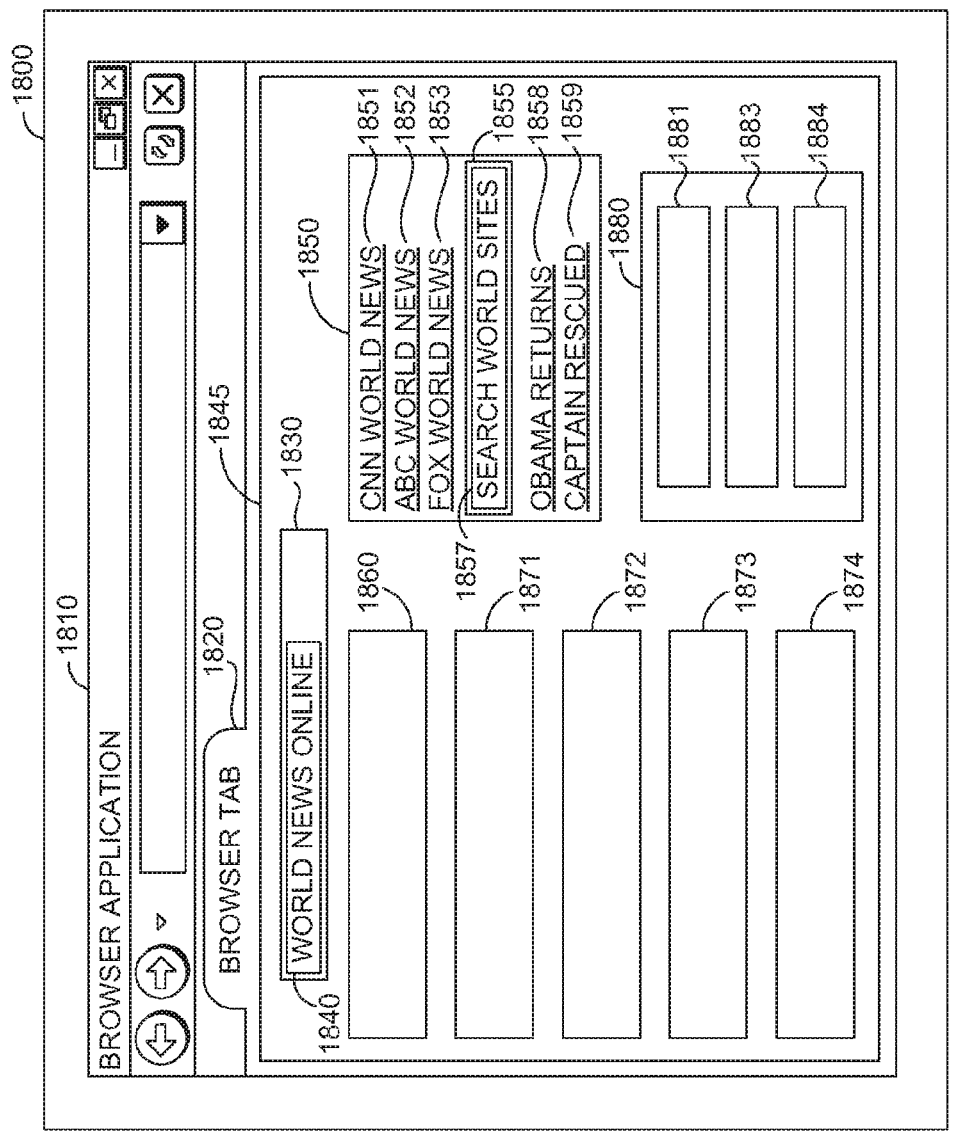
FIG. 18 is an alternative screen shot of an exemplary graphical user interface for presenting a task related hyper request for selection by a user, in accordance with an embodiment of the invention.

A screen shot of an exemplary graphical user interface for presenting a task-related hyper-request is displayed in FIG. 18. A second hyper-request such as text string 1840 is input into a control 1830, such as a text box in display area 1845. A second display area such as task pane 1850 provides a number of controls 1851, 1852, 1853, 1855, 1858, and 1859. Some of these controls are displayed as hypertext that results in a query request for the displayed text being sent to a search engine server, e.g., search engine server 204 of FIG. 4. In the example shown the text string 1840 "world news online" was entered, and processed by search engine 204 of FIG. 4, which determined, utilizing related sites determination component 424, that this hyper-request is a parent category to daughter hyper-requests for "cnn world news," "abc world news," and "fox world news." These daughter hyper-requests are therefore determined to be likely associated with the task of searching for world news online. This determination was made from a signature in one or more prior logs which indicated that when a hyper-request for "world news online" was made, the requests for CNN, ABC or FOX world news were chosen each with about 5% likelihood from a list of 10 possibilities. The task box 1850 is presented consistently at the top of the SERP. It is adjacent to paid advertising pane 1860 and above paid advertising pane 1880. Since task pane 1850 is presented near the query input text box 1830 which is at the top of the page, therefore it is substantially at the top of the search engine response page. A number of index results produced by, e.g., search result determination component 420 of FIG. 4, are presented in the SERP as results 1871, 1872, 1873, and 1874, and in paid advertising results 1860, 1881, 1883, and 1884. Embodiments display the task pane 1850 upon determination that there are a minimum number of sites related to the task derived from text string 1840.

Continuing with FIG. 18, control 1855 presents an instruction in 1857 explaining to the user that a text string entered into the control box 1855 will be used as the basis of a search over the related sites for CNN, ABC and FOX. Embodiments of the font in 1857 are grayed out to indicate that it is an instruction to the user, and upon clicking on search box 1855, the instructional text disappears. Control 1858 is a hypertext control providing a tool for use with the related sites. The displayed words of 1858 are significant informational words from a breaking news story that was most recently provided from the CNN site. Control 1859 is a hypertext control providing a tool for searching all sites for headlines involving the significant news that is represented by significant terms from titles of related breaking news.

Figure 19:
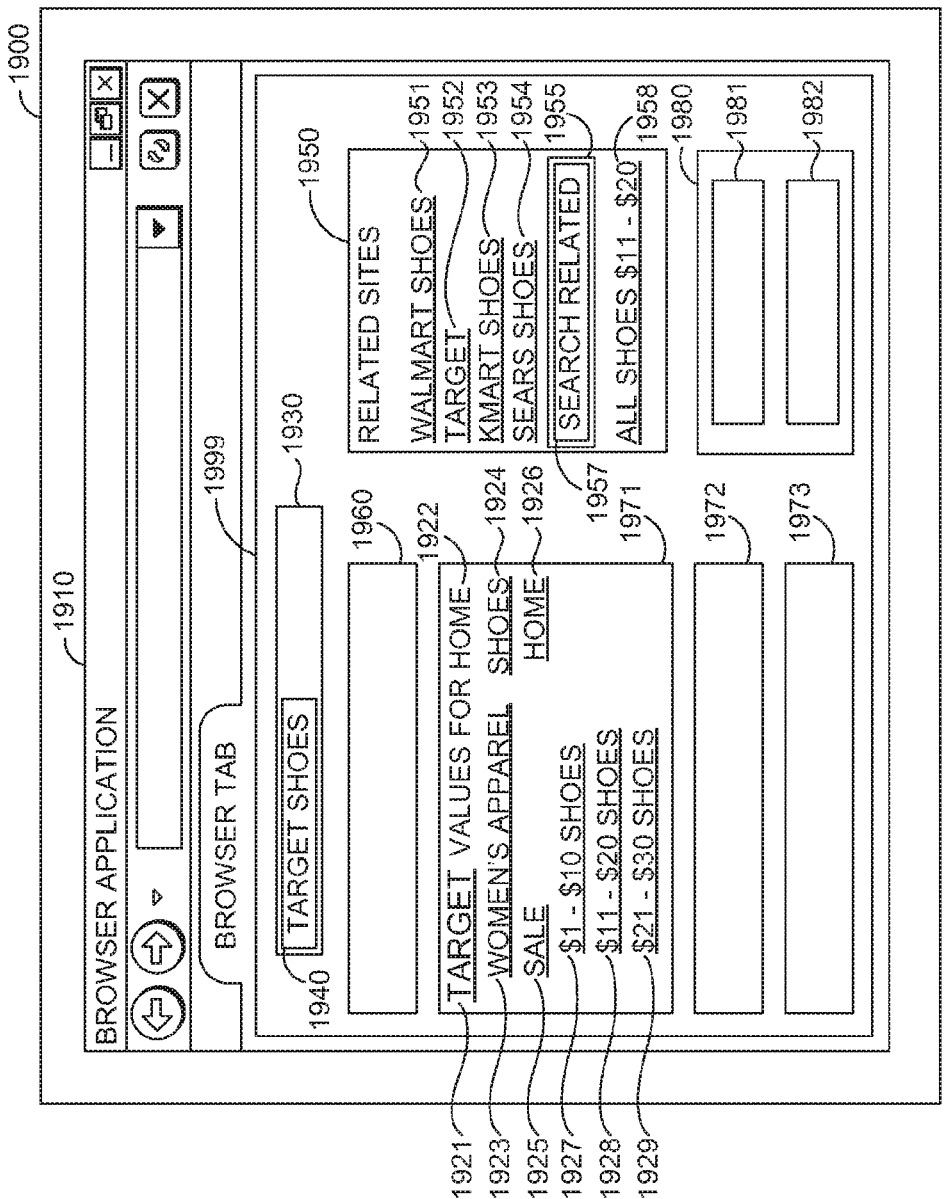
FIG. 19 is an alternative screen shot of an exemplary graphical user interface for presenting a task related hyper-request for selection by a user, in accordance with an embodiment of the invention.

Turning now to FIG. 19, there is presented in a screen shot 1900 of a graphical user interface for presenting a task-related hyper-request for selection by a user. Control 1930 is a text box that receives a string representative of a second hyper-request from a second user. Advertising information is presented in 1960, and 1980, including index results from, e.g., search result determination component 420 of FIG. 4, in entries 1960, 1981 and 1982. The example shown receives in 1940 the text string "target shoes." Task pane 1950 presents controls for hyper-requests to a search engine server, e.g., search engine server 204 of FIG. 4, for hyper-requests that have been determined to be likely related to target shoes, including query requests for "walmart shoes" 1951, "target" 1952, "Kmart shoes" 1953, and "sears shoes" 1954. These requests were determined, e.g., by search engine server 204 of FIG. 4, to be likely related to string 1940 by processing a log of prior sessions containing "target shoes." This analysis determined that users frequently entered the related queries 1951, 1952, 1953, and 1954 in the same sessions that requested "target shoes." These hyper-requests were determined to be navigational to the corresponding URLs for alternative commercial sites such as those for walmart, target, kmart and sears. Control 1955 presents a prompt in 1957 telling the user to enter a string, if desired, to be used as the basis of a query that searches all related sites for the entered string. Control 1958 searches a site related to the category determined from query string 1940 for the merchandise specified within the displayed price range. As such, the description "all shoes $11-$20" tells the user what hyper-request will be performed upon selection. Other examples of descriptions include "music videos" for searching one or more video related sites, "Obama returns" in 1458 for searching one or more news related sites, and "all shoes $1-$10" in 1927 for searching a retail site competitor to Target.

Another embodiment of a display area comprising a control for task related hyper-requests is shown in 1971, which presents one of the results corresponding to a hyper-request 1940. Result 1971 has a number of entries such as 1921, 1923, 1925, 1924, 1926, 1927, 1928 and 1929. Hypertext in 1921 provides a link to the URL for target. A description of the site is given in 1922. The link corresponding to "target shoes" is provided in 1924. Other hyperlinks provide data mined from the target site including 1923 for women's apparel, 1926 for home furnishings, and 1925 for sale items. In 1927, 1928, and 1929 there are tools and controls presented that allow the user to search the related merchandise at Target, or one or more related sites for products in the price ranges displayed. The display areas 1971 and 1950 are presented substantially at the top of the SERP because they are presented in close proximity to the search box 1930 at the top of the page.

The controls presented in the foregoing examples were primarily menus, hyperlinks and search boxes. A graphical user interface control is generally any component or group of components including receptors capable of effecting operations under user activation or initiation such as a button, menu, context menu, pie menu, menu bar, toolbar, or ribbon. Embodiments of a graphical user interface controls also include items capable of both data input and output such as a check box, radio button, slider, list box, spinner, drop-down list, combo box, text box, grid view or tree view. A display area generally refers to a graphical user interface containing command inputs and/or data input-output operators and providing information operators such as labels, tooltips, balloon help, status bar, progress bar, info bar, throbber, heads-up display, or toast, or a grouping operator such as window, tab, accordion or disclosure widget. A receptor generally is a graphical user interface element which retains information indicated by user effecting a persisting informational state that may be used as part of a control such as a check box, radio button, slider, list box, spinner, drop-down list, combo box, text box, grid view, tree view or command input that in cases effects persisting state such as buttons, menus, context menu, pie menu, menu bar, toolbar, or ribbon. An indicator is generally a display indicating underlying program state or information such as an informational output such as a label, tooltip, balloon help, status bar, progress bar, info bar, throbber, heads-up display, toast, or an operator that serves both as input and output such as a check box, colored button, radio button, slider, list box, spinner, drop-down list, combo box, text box, grid view or tree view. Equivalents to one or more of the these include a modal window, palette window, inspector window, dialog box, alert dialog box, file dialog, about box, breadcrumb, icon, scrollbar, or metawidget.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

The invention claimed is:

1. One or more computer hardware storage media having computer-executable instructions embodied thereon that, when executed, perform a method for providing uniform resource locators (URLs) related to search results determined for search queries input by users, the method comprising:
receiving a search query input by a user;
determining that the search query is a task-oriented search query;
determining that the user intends to engage in a particular task, wherein the particular task is one of shopping, social networking, researching a topic, reading news, reviewing blogs, searching for reviews, and booking a trip;
identifying at least one search result that satisfies the task-oriented search query;
identifying, with respect to the at least one search result, at least one related URL that is related to the at least one search result;
presenting an identifier for the at least one related URL in association with an identifier for the at least one search result;
presenting one or more controls in association with the identifier for the at least one related URL and the identifier for the at least one search result, each control permitting user input of an additional query;
receiving, via the one or more controls, user input of the additional query; and
querying content associated with a web site associated with the at least one related URL to determine if the content associated with the web site matches the additional query.

2. The media of claim 1, wherein determining that the search query is a task-oriented search query is performed using at least one query log.

3. The media of claim 2, wherein the at least one query log comprises at least one of aggregate past user session data and current session data associated with the user.

4. The media of claim 1, wherein determining that the search query is a task-oriented search query comprises determining that the search query is a navigational search query.

5. The media of claim 1, wherein determining that the search query is a task-oriented search query comprises determining that the search query is a categorical search query.

6. The media of claim 1, wherein presenting the identifier for the at least one related URL in association with the identifier for the at least one search result comprises presenting the identifier for the at least one related URL and the identifier for the at least one search result in association with one another on a search engine results page.

7. The media of claim 1 further comprises navigating to one of the at least one related URLs upon user selection of a representation for the one of the at least one related URLs.

8. The media of claim 7, wherein the at least one related URL is automatically identified.

9. One or more computer hardware storage media having computer-executable instructions embodied thereon that, when executed, perform a method for providing uniform resource locators (URLs) related to search results determined for search queries input by users, the method comprising:
receiving a search query, the search query indicating the user intends to engage in a particular task comprising one of shopping, social networking, researching a topic, reading news, reviewing blogs, searching for reviews, or booking a trip;
identifying at least one search result that satisfies the search query;
identifying at least one related URL that is related to the at least one search result;
providing an indication of the at least one related URL in association with an identifier for the at least one search result;
providing a control that corresponds with the at least one related URL, the control permitting user input of an additional query;
receiving, via the control, user input of the additional query; and
searching content associated with a web site corresponding to the at least one related URL to determine if any of the content matches the additional query.

10. The media of claim 9 further comprising determining that the search query is a task-oriented search query using at least one query log.

11. The media of claim 10, wherein the at least one query log comprises at least one of aggregate past user session data and current session data associated with the user.

12. The media of claim 10, wherein determining that the search query is a task-oriented search query comprises determining that the search query is a navigational search query.

13. The media of claim 10, wherein determining that the search query is a task-oriented search query comprises determining that the search query is a categorical search query.

14. The media of claim 9, wherein presenting an indication of the at least one related URL comprises presenting the indication of the at least one related URL on a search engine results page.

15. The media of claim 9 further comprising navigating to one of the at least one related URLs upon user selection of a representation corresponding with the one of the at least one related URLs.

16. The media of claim 9, wherein the at least one related URL is automatically identified.

17. A method for providing uniform resource locators (URLs) related to search results determined for search queries input by users, the method comprising:
   receiving a search query, the search query indicating the user intends to engage in a particular task comprising one of shopping, social networking, researching a topic, reading news, reviewing blogs, searching for reviews, or booking a trip;
   identifying a plurality of search results that satisfies the search query;
   identifying a related URL that is related to one of the plurality of search results;
   providing an indication of the related URL in association with an identifier for the at least one search result;
   providing a control that corresponds with the related URL, the control permitting user input of an additional query;
   receiving, via the control, user input of the an additional query; and
   searching web site content associated with the related URL to determine if any of the website content matches the additional query.

18. The method of claim 17 further comprising determining that the search query is a task-oriented search query using at least one query log.

19. The method of claim 17 further comprising navigating to the related URL upon user selection of the related URL.

20. The method of claim 17, wherein the related URL is automatically identified.

\* \* \* \* \*